(12) United States Patent
Kobayashi

(10) Patent No.: US 12,742,480 B2
(45) Date of Patent: Sep. 22, 2026

(54) CLUTCH APPARATUS AND MOTORCYCLE

(71) Applicant: Kabushiki Kaisha F.C.C., Hamamatsu (JP)

(72) Inventor: Yuki Kobayashi, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 95 days.

(21) Appl. No.: 18/879,999

(22) PCT Filed: Jun. 27, 2023

(86) PCT No.: PCT/JP2023/023849
§ 371 (c)(1),
(2) Date: Sep. 26, 2025

(87) PCT Pub. No.: WO2024/014284
PCT Pub. Date: Jan. 18, 2024

(65) Prior Publication Data

US 2026/0218758 A1 Jul. 30, 2026

(30) Foreign Application Priority Data

Jul. 15, 2022 (JP) ................................ 2022-114262
Apr. 14, 2023 (JP) ................................ 2023-066658

(51) Int. Cl.
*F16D 13/56* (2006.01)
*F16D 13/64* (2006.01)
*F16D 13/70* (2006.01)

(52) U.S. Cl.
CPC .......... *F16D 13/56* (2013.01); *F16D 13/644* (2013.01); *F16D 13/70* (2013.01)

(58) Field of Classification Search
CPC ......... F16D 13/52–56; F16D 2023/123; F16D 13/70
See application file for complete search history.

(56) References Cited

U.S. PATENT DOCUMENTS 5,617,938 A 4/1997 Tsukada et al.
11,841,054 B1 * 12/2023 Furuhashi .............. F16D 13/52
(Continued)

FOREIGN PATENT DOCUMENTS

JP S5917030 A 1/1984
JP H0893786 A 4/1996
(Continued)

OTHER PUBLICATIONS

International Search Report in PCT/JP2023/023849, mailed Sep. 5, 2023, 2 pages.

(Continued)

*Primary Examiner* — Ernesto A Suarez
*Assistant Examiner* — Lillian T Nguyen
(74) *Attorney, Agent, or Firm* — Keating & Bennett, LLP

(57) ABSTRACT

A clutch apparatus includes a pressure plate that is able to push input-side rotary plates and output-side rotary plates. The pressure plate includes an annular portion, a base wall radially outward of the annular portion, an outer peripheral wall radially outward of the base wall, a pressure-side cam hole extending through the base wall, and ribs extending in a second direction from a surface of the base wall, which is connected to the annular portion. The ribs and the outer peripheral wall are spaced away from each other in a radial direction.

11 Claims, 14 Drawing Sheets

(56) References Cited

U.S. PATENT DOCUMENTS

| | | | | |
|---|---|---|---|---|
| 11,933,368 | B1 * | 3/2024 | Kobayashi | F16D 13/70 |
| 2009/0071792 | A1 | 3/2009 | Kataoka et al. | |
| 2016/0333943 | A1 | 11/2016 | Chiba et al. | |
| 2017/0159725 | A1 * | 6/2017 | Imanishi | F16D 13/52 |
| 2019/0285124 | A1 * | 9/2019 | Imanishi | F16D 23/12 |
| 2020/0158194 | A1 | 5/2020 | Kataoka et al. | |
| 2021/0123482 | A1 | 4/2021 | Kobayashi et al. | |
| 2021/0310523 | A1 * | 10/2021 | Matsuyoshi | F16D 13/646 |

FOREIGN PATENT DOCUMENTS

| | | | |
|---|---|---|---|
| JP | 2009068578 | A | 4/2009 |
| JP | 2016070287 | A | 5/2016 |
| JP | 2016211688 | A | 12/2016 |
| JP | 2018204655 | A | 12/2018 |
| JP | 6894792 | B2 | 6/2021 |
| WO | 2018172176 | A1 | 9/2018 |

OTHER PUBLICATIONS

Kobayashi, “Clutch Apparatus and Motorcycle”, U.S. Appl. No. 18/879,997, filed Dec. 30, 2024.

* cited by examiner

FIG. 12

CLUTCH APPARATUS AND MOTORCYCLE

BACKGROUND OF THE INVENTION

1 . Field of the Invention

The present invention relates to clutch apparatuses and motorcycles. More specifically, the present invention relates to clutch apparatuses each of which freely transmits a rotational driving force of an input shaft, which is rotationally driven by a motor such as an engine, to an output shaft or cuts off the rotational driving force, and relates to motorcycles including the clutch apparatuses.

This application claims the benefit of priority to Japanese Patent Application No. 2022-114262 filed on Jul. 15, 2022, and Japanese Patent Application No. 2023-066658 filed on Apr. 14, 2023, the entire contents of each of which are incorporated herein by reference.

2. Description of the Related Art

Vehicles known in the art, such as motorcycles, include clutch apparatuses. Such a clutch apparatus is disposed between an engine and a driving wheel so as to transmit a rotational driving force of the engine to the driving wheel or cut off the rotational driving force. The clutch apparatus usually includes input-side rotary plates to be rotated with the rotational driving force of the engine, and output-side rotary plates connected to an output shaft through which the rotational driving force is to be transmitted to the driving wheel. The input-side rotary plates and the output-side rotary plates are disposed alternately in a stacked direction. The input-side rotary plates and the output-side rotary plates are pressed against each other so as to transmit the rotational driving force and are moved away from each other so as to cut off the rotational driving force.

Japanese U.S. Pat. No. 6,894,792 and WO 2018/172176, for example, each disclose a clutch apparatus including a clutch center and a pressure plate provided so as to be movable toward and away from the clutch center. The pressure plate is configured to be able to push input-side rotary plates and output-side rotary plates. In the clutch apparatus, the clutch center and the pressure plate are thus used by being assembled to each other.

The clutch center and the pressure plate of the clutch apparatus according to each of Japanese U.S. Pat. No. 6,894,792 and WO 2018/172176 each include an assist cam surface to increase a pushing force for the input-side rotary plates and the output-side rotary by generating a force in a direction in which the pressure plate is moved toward the clutch center when a rotational driving force of an engine is transmittable to an output shaft, and a slipper cam surface to reduce the pushing force for the input-side rotary plates and the output-side rotary by moving the pressure plate away from the clutch center when the clutch center is higher in rotational speed than the pressure plate.

SUMMARY OF THE INVENTION

The pressure plate described in WO 2018/172176 includes, in its center, an annular portion. The annular portion is required to have high bending rigidity because bending stress may be applied thereto, for example, during clutch engagement. The pressure plate is desirably provided with a through hole through which clutch oil is guidable from outside to inside the pressure plate such that the clutch oil is effectively guided into the pressure plate.

Example embodiments of the present invention provide clutch apparatuses each including a pressure plate that allows clutch oil to be guided thereinto effectively while ensuring sufficient rigidity of an annular portion of the pressure plate, and motorcycles including the clutch apparatuses.

The inventor of example embodiments of the present application came up with the idea of providing ribs connected to an output shaft holder in order to ensure sufficient rigidity of the output shaft holder. The inventor, however, discovered that if the ribs connected to the output shaft holder are extended to an annular outer peripheral wall, the ribs inhibit a flow of clutch oil, making it difficult to guide clutch oil into a pressure plate center through a through hole. Accordingly, a solution discovered by the inventor is to create a clearance between each rib and the outer peripheral wall so as to allow clutch oil to flow smoothly.

A clutch apparatus according to an example embodiment of the present invention is a clutch apparatus to transmit a rotational driving force of an input shaft to an output shaft or cut off the rotational driving force and includes a clutch center housed in a clutch housing holding input-side rotary plates to be rotationally driven in response to rotational driving of the input shaft, the clutch center being rotationally drivable together with the output shaft, and a pressure plate that is movable toward or away from the clutch center and rotatable relative to the clutch center, the pressure plate holding output-side rotary plates alternatingly positioned with the input-side rotary plates and being operable to push the input-side rotary plates and the output-side rotary plates, wherein the pressure plate includes an annular portion, a base wall radially outward of the annular portion, an annular outer peripheral wall radially outward of the base wall and extending in a movement direction, assuming that a direction in which the pressure plate is movable toward and away from the clutch center is the movement direction, a direction in which the pressure plate is movable toward the clutch center is a first direction, and a direction in which the pressure plate is movable away from the clutch center is a second direction, a through hole extending through the base wall in the movement direction, and ribs extending in the second direction from a surface of the base wall located in the second direction, the ribs being connected to the annular portion, and the ribs and the outer peripheral wall are spaced away from each other in a radial direction.

In the clutch apparatus according to an example embodiment of the present invention, the pressure plate includes the ribs extending in the second direction from the surface of the base wall, which is located in the second direction, and connected to the annular portion. This enhances the rigidity of the annular portion so as to enable the annular portion to have sufficient bending rigidity. The ribs and the outer peripheral wall are spaced away from each other in the radial direction. Thus, clutch oil that has been moved toward the outer peripheral wall by a centrifugal force produced upon rotation of the pressure plate is allowed to smoothly move along the surface of the base wall located in the second direction without being inhibited by the ribs. The clutch oil is then guidable into the pressure plate through the through hole provided in the base wall.

A clutch apparatus according to another example embodiment of the present invention is a clutch apparatus to transmit a rotational driving force of an input shaft to an output shaft or cut off the rotational driving force and includes a clutch center housed in a clutch housing holding input-side rotary plates to be rotationally driven in response to rotational driving of the input shaft, the clutch center being rotationally drivable together with the output shaft, and a pressure plate that is movable toward or away from the clutch center and rotatable relative to the clutch center, the pressure plate holding output-side rotary plates alternatingly positioned with the input-side rotary plates and being operable to push the input-side rotary plates and the output-side rotary plates, wherein the pressure plate includes an annular portion, a base wall radially outward of the annular portion, pressure-side cam portions protruding in a first direction from a surface of the base wall located in the first direction, the pressure-side cam portions including: pressure-side assist cam surfaces to, upon being rotated relative to the clutch center, produce a force in a direction in which the pressure plate is movable toward the clutch center so as to increase a pushing force for the input-side rotary plates and the output-side rotary plates, assuming that a direction in which the pressure plate is movable toward and away from the clutch center is a movement direction, a direction in which the pressure plate is movable toward the clutch center is the first direction, and a direction in which the pressure plate is movable away from the clutch center is a second direction, an annular outer peripheral wall radially outward of the base wall and extending in the movement direction, a through hole extending through the base wall in the movement direction so as to be located between adjacent ones of the pressure-side cam portions, and ribs extending in the second direction from a surface of the base wall located in the second direction, the ribs being connected to the annular portion, and the ribs and the outer peripheral wall are spaced away from each other in a radial direction.

In the clutch apparatus according to the another example embodiment of the present invention discussed above, the pressure plate includes the ribs extending in the second direction from the surface of the base wall, which is located in the second direction, and connected to the annular portion. This enhances the rigidity of the annular portion so as to enable the annular portion to have sufficient bending rigidity. The ribs and the outer peripheral wall are spaced away from each other in the radial direction. Thus, clutch oil that has been moved toward the outer peripheral wall by a centrifugal force produced upon rotation of the pressure plate is allowed to smoothly move along the surface of the base wall located in the second direction without being inhibited by the ribs. The clutch oil is then guidable into the pressure plate through the through hole provided in the base wall.

A clutch apparatus according to a further example embodiment of the present invention is a clutch apparatus to transmit a rotational driving force of an input shaft to an output shaft or cut off the rotational driving force and includes a clutch center housed in a clutch housing holding input-side rotary plates to be rotationally driven in response to rotational driving of the input shaft, the clutch center being rotationally drivable together with the output shaft, and a pressure plate that is movable toward or away from the clutch center and rotatable relative to the clutch center, the pressure plate holding output-side rotary plates alternatingly positioned with the input-side rotary plates and being operable to push the input-side rotary plates and the output-side rotary plates, wherein the pressure plate includes an annular portion, a base wall radially outward of the annular portion, pressure-side cam portions protruding in a first direction from a surface of the base wall located in the first direction, the pressure-side cam portions including pressure-side slipper cam surfaces to, upon being rotated relative to the clutch center, move the pressure plate away from the clutch center so as to reduce a pushing force for the input-side rotary plates and the output-side rotary plates, assuming that a direction in which the pressure plate is movable toward and away from the clutch center is a movement direction, a direction in which the pressure plate is movable toward the clutch center is the first direction, and a direction in which the pressure plate is movable away from the clutch center is a second direction, an annular outer peripheral wall radially outward of the base wall and extending in the movement direction, a through hole extending through the base wall in the movement direction so as to be located between adjacent ones of the pressure-side cam portions, and ribs extending in the second direction from a surface of the base wall located in the second direction, the ribs being connected to the annular portion, and the ribs and the outer peripheral wall are spaced away from each other in a radial direction.

In the clutch apparatus according to the further example embodiment of the present invention, the pressure plate includes the ribs extending in the second direction from the surface of the base wall, which is located in the second direction, and connected to the annular portion. This enhances the rigidity of the annular portion so as to enable the annular portion to have sufficient bending rigidity. The ribs and the outer peripheral wall are spaced away from each other in the radial direction. Thus, clutch oil that has been moved toward the outer peripheral wall by a centrifugal force produced upon rotation of the pressure plate is allowed to smoothly move along the surface of the base wall located in the second direction without being inhibited by the ribs. The clutch oil is then guidable into the pressure plate through the through hole provided in the base wall.

Example embodiments of the present invention provide clutch apparatuses each including a pressure plate that allows clutch oil to be guided thereinto effectively while ensuring sufficient rigidity of an annular portion of the pressure plate.

The above and other elements, features, steps, characteristics and advantages of the present invention will become more apparent from the following detailed description of the example embodiments with reference to the attached drawings.

BRIEF DESCRIPTION OF THE DRAWINGS

FIG. 12 is an exploded perspective view of a clutch center and a pressure plate according to another example embodiment of the present invention.

DETAILED DESCRIPTION OF THE EXAMPLE EMBODIMENTS

Example embodiments of clutch apparatuses according to the present invention will be described below with reference to the drawings. The example embodiments described herein are naturally not intended to limit the present invention in any way. Components and elements having the same functions will be identified by the same reference signs and will not be described or will be described briefly when deemed redundant.

First Example Embodiment

Figure 1:
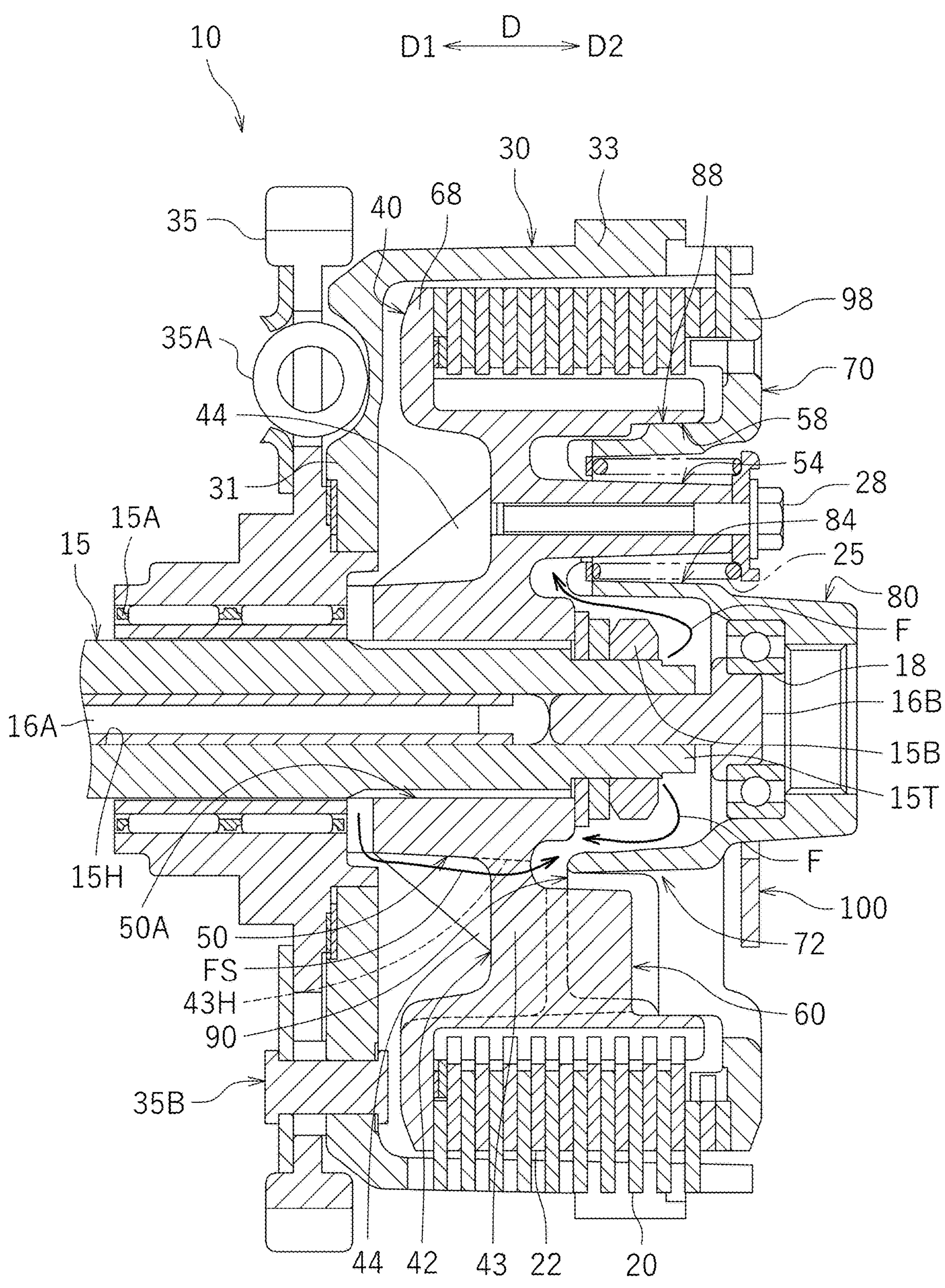
FIG. 1 is a cross-sectional view of a clutch apparatus according to an example embodiment of the present invention.

FIG. 1 is a cross-sectional view of a clutch apparatus 10 according to the present example embodiment. The clutch apparatus 10 is installed, for example, on a vehicle, such as a motorcycle. The clutch apparatus 10 is, for example, an apparatus to transmit a rotational driving force of an input shaft (e.g., a crankshaft) of an engine on a motorcycle to an output shaft 15 or cut off the rotational driving force. The clutch apparatus 10 is an apparatus to transmit the rotational driving force of the input shaft to a driving wheel (e.g., a rear wheel) through the output shaft or cut off the rotational driving force. The clutch apparatus 10 is disposed between the engine and a transmission.

In the following description, a direction in which a pressure plate 70 of the clutch apparatus 10 moves toward and away from a clutch center 40 will be referred to as a "direction D" (which is an example of a movement direction), a direction in which the pressure plate 70 moves toward the clutch center 40 will be referred to as a "first direction D1", and a direction in which the pressure plate 70 moves away from the clutch center 40 will be referred to as a "second direction D2". A circumferential direction of the clutch center 40 and the pressure plate 70 will be referred to as a "circumferential direction S", a direction from a first one of pressure-side cam portions 90 to a second one of the pressure-side cam portions 90 (i.e., a direction from a first one of center-side cam portions 60 to a second one of the center-side cam portions 60) in the circumferential direction S will be referred to as a "first circumferential direction S1" (see FIG. 7), and a direction from the second one of the pressure-side cam portions 90 to the first one of the pressure-side cam portions 90 (i.e., a direction from the second one of the center-side cam portions 60 to the first one of the center-side cam portions 60) in the circumferential direction S will be referred to as a "second circumferential direction S2" (see FIG. 7). In the present example embodiment, an axial direction of the output shaft 15, an axial direction of a clutch housing 30, an axial direction of the clutch center 40, and an axial direction of the pressure plate 70 each correspond to the direction D. The pressure plate 70 and the clutch center 40 rotate in the first circumferential direction S1 (i.e., in a direction from a center-side assist cam surface 60A of each center-side cam portion 60 to a center-side slipper cam surface 60S thereof). These directions, however, are defined merely for the sake of convenience of description and thus do not limit in any way how the clutch apparatus 10 may be installed or do not limit in any way any of the example embodiments of the present invention.

As illustrated in FIG. 1, the clutch apparatus 10 includes the output shaft 15, input-side rotary plates 20, output-side rotary plates 22, the clutch housing 30, the clutch center 40, the pressure plate 70, and a stopper plate 100.

As illustrated in FIG. 1, the output shaft 15 is a hollow shaft body. A first end portion of the output shaft 15 supports an input gear 35 and the clutch housing 30 (which will be described below) through a needle bearing 15A such that the input gear 35 and the clutch housing 30 are rotatable. The output shaft 15 supports the clutch center 40 through a nut 15B such that the clutch center 40 is fixed to the output shaft 15. In other words, the output shaft 15 rotates together with the clutch center 40. A second end portion of the output shaft 15 is connected to, for example, the transmission (not illustrated) of the motorcycle.

As illustrated in FIG. 1, the output shaft 15 includes, in its hollow portion 15H, a push rod 16A and a pushed body 16B provided adjacent to the push rod 16A. The hollow portion 15H functions as a clutch oil flow passage. Clutch oil flows through the output shaft 15, i.e., through its hollow portion 15H. The push rod 16A and the pushed body 16B are slidable through the hollow portion 15H of the output shaft 15. A first end portion (i.e., a left end portion in FIG. 1) of the push rod 16A is connected to a clutch operation lever (not illustrated) of the motorcycle such that the push rod 16A slides through the hollow portion 15H in response to an operation performed on the clutch operation lever and thus pushes the pushed body 16B in the second direction D2. A portion of the pushed body 16B protrudes out of the output shaft 15 (i.e., in the second direction D2 in this example embodiment) and connected to a release bearing 18 provided on the pressure plate 70. The push rod 16A and the pushed body 16B are each smaller than an inner diameter of the hollow portion 15H, which allows clutch oil to flow through the hollow portion 15H.

The clutch housing 30 is made of an aluminum alloy. The clutch housing 30 has a cylindrical or substantially cylindrical shape with a bottom. As illustrated in FIG. 1, the clutch housing 30 includes a substantially circular bottom wall 31 and a side wall 33 extending in the second direction D2 from an edge of the bottom wall 31. The clutch housing 30 holds the input-side rotary plates 20.

As illustrated in FIG. 1, the bottom wall 31 of the clutch housing 30 is provided with the input gear 35. The input gear 35 is secured through a torque damper 35A to the bottom wall 31 with a rivet 35B. The input gear 35 meshes with a driving gear (not illustrated) that rotates in response to rotational driving of the input shaft of the engine. The input gear 35 is rotationally driven independently of the output shaft 15 and together with the clutch housing 30.

The input-side rotary plates 20 are rotationally driven in response to rotational driving of the input shaft. As illustrated in FIG. 1, the input-side rotary plates 20 are held on an inner peripheral surface of the side wall 33 of the clutch housing 30. The input-side rotary plates 20 are held by the clutch housing 30 through spline-fitting. The input-side rotary plates 20 are movable in the axial direction of the clutch housing 30. The input-side rotary plates 20 are rotatable together with the clutch housing 30.

The input-side rotary plates 20 are components to be pushed against the output-side rotary plates 22. The input-side rotary plates 20 are annular flat plates. The input-side rotary plates 20 are each formed by punching a thin plate made of a steel plate cold commercial (SPCC) material into an annular shape, for example. Friction materials (not illustrated) made of pieces of paper are affixed to front and back surfaces of the input-side rotary plates 20. Between the friction materials, grooves to retain clutch oil are formed to a depth of a few or several um to a few or several tens of μm, for example.

As illustrated in FIG. 1, the clutch center 40 is housed in the clutch housing 30. The clutch center 40 is disposed concentrically with the clutch housing 30. The clutch center 40 includes a cylindrical body 42 and a flange 68 extending radially outward from an outer peripheral edge of the body 42. The clutch center 40 holds the output-side rotary plates 22 positioned alternatingly with the input-side rotary plates 20 in the direction D. The clutch center 40 is rotationally driven together with the output shaft 15.

Figure 2:
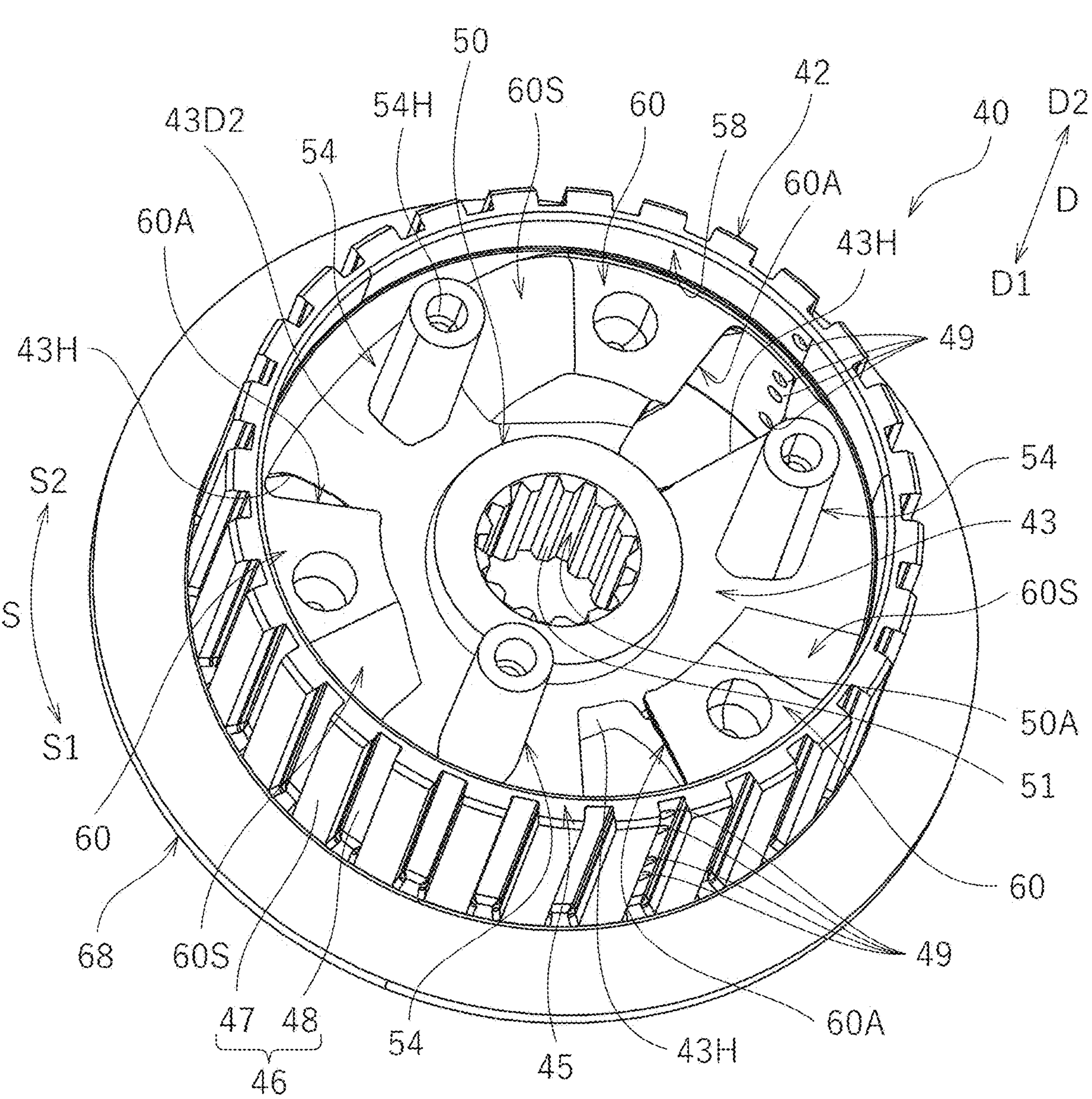
FIG. 2 is a perspective view of a clutch center according to an example embodiment of the present invention.

As illustrated in FIG. 2, the body 42 includes an output shaft holder 50, an annular base wall 43 radially outward of the output shaft holder 50, an outer peripheral wall 45 radially outward of the base wall 43 and extending in the direction D, the center-side cam portions 60 connected to the base wall 43 and the outer peripheral wall 45, and a center-side fitting portion 58.

The output shaft holder 50 has a cylindrical or substantially cylindrical shape. The output shaft holder 50 is provided with an insertion hole 51 into which the output shaft 15 is inserted and spline-fitted. The insertion hole 51 extends through the base wall 43. An inner peripheral surface 50A of the output shaft holder 50, which defines the insertion hole 51, is provided with spline grooves extending in its axial direction. The output shaft 15 is connected to the output shaft holder 50.

As illustrated in FIG. 2, the outer peripheral wall 45 of the clutch center 40 is disposed radially outward of the output shaft holder 50. The outer peripheral wall 45 is radially outward of the center-side cam portions 60. The outer peripheral wall 45 has an annular shape. The base wall 43 is located at a location somewhere along the outer peripheral wall 45 in the direction D. Specifically, the outer peripheral wall 45 includes a portion located in the first direction D1 relative to the base wall 43, and a portion located in the second direction D2 relative to the base wall 43. An outer peripheral surface of the outer peripheral wall 45 is provided with a spline-fitting portion 46. The spline-fitting portion 46 includes center-side fitting teeth 47 extending in the axial direction of the clutch center 40 along the outer peripheral surface of the outer peripheral wall 45; spline grooves 48 provided between adjacent ones of the center-side fitting teeth 47 and extending in the axial direction of the clutch center 40, and oil discharge holes 49. The center-side fitting teeth 47 hold the output-side rotary plates 22. The center-side fitting teeth 47 are arranged in the circumferential direction S. The center-side fitting teeth 47 are provided at equal or substantially equal intervals in the circumferential direction S. The center-side fitting teeth 47 are similar in shape. The center-side fitting teeth 47 protrude radially outward from the outer peripheral surface of the outer peripheral wall 45. The oil discharge holes 49 are provided radially through the outer peripheral wall 45. The oil discharge holes 49 are provided between adjacent ones of the center-side fitting teeth 47. In other words, the oil discharge holes 49 are provided in the spline grooves 48. The oil discharge holes 49 are provided laterally of the center-side cam portions 60. The oil discharge holes 49 are provided laterally of the center-side slipper cam surfaces 60S of the center-side cam portions 60. The oil discharge holes 49 are provided in the second circumferential direction S2 relative to the center-side slipper cam surfaces 60S. The oil discharge holes 49 are provided in the first circumferential direction S1 relative to bosses 54 (which will be described below). The oil discharge holes 49 are radially outward of center-side cam holes 43H (which will be described below). In the present example embodiment, four of the oil discharge holes 49 are provided at each of three locations situated on the outer peripheral wall 45 in the circumferential direction S, for example. The oil discharge holes 49 are provided at equal or substantially equal intervals in the circumferential direction S. The oil discharge holes 49 allow communication between inside and outside of the clutch center 40. The oil discharge holes 49 are holes through which clutch oil that has flowed out of the output shaft 15 into the clutch center 40 and/or clutch oil that has been guided from outside to inside the clutch center 40 through the center-side cam holes 43H are/is to be discharged out of the clutch center 40. The clutch oil that has been discharged through the oil discharge holes 49 is supplied to the input-side rotary plates 20 and the output-side rotary plates 22 radially outward of the oil discharge holes 49.

The output-side rotary plates 22 are held by the spline-fitting portion 46 of the clutch center 40 and the pressure plate 70. Portions of the output-side rotary plates 22 are held by the center-side fitting teeth 47 and the spline grooves 48 of the clutch center 40 through spline-fitting. The other portions of the output-side rotary plates 22 are held by after-mentioned pressure-side fitting teeth 77 (see FIG. 6) of the pressure plate 70. The output-side rotary plates 22 are movable in the axial direction of the clutch center 40. The output-side rotary plates 22 are rotatable together with the clutch center 40.

The output-side rotary plates 22 are components to be pushed against the input-side rotary plates 20. The output-side rotary plates 22 are annular flat plates. The output-side rotary plates 22 are each formed by punching a thin plate made of an SPCC material into an annular shape, for example. On front and back surfaces of the output-side rotary plates 22, grooves to retain clutch oil are formed to a depth of a few or several μm to a few or several tens of μm, for example. The front and back surfaces of the output-side rotary plates 22 are each subjected to surface hardening in order to enhance wear resistance. Alternatively, the friction materials provided on the input-side rotary plates 20 may be provided on the output-side rotary plates 22 instead of being provided on the input-side rotary plates 20, or may be provided on both of the input-side rotary plates 20 and the output-side rotary plates 22.

Figure 3:
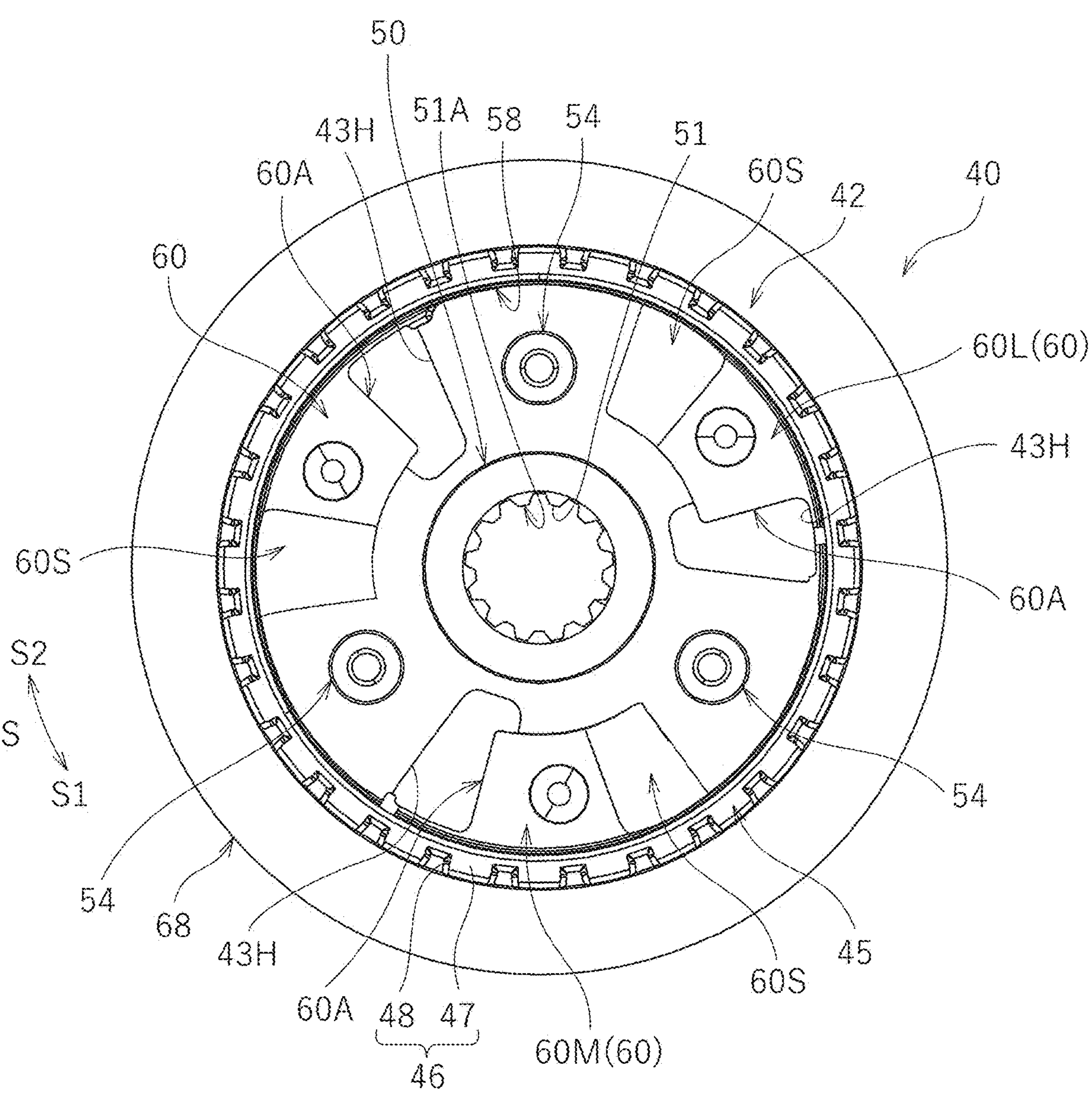
FIG. 3 is a plan view of a clutch center according to an example embodiment of the present invention.

The center-side cam portions 60 are each in the shape of a block with cam surfaces that are inclined surfaces included in an assist & slipper (registered trademark) mechanism for producing an assist torque, which is a force to increase a pushing force (or pressing force) for the input-side rotary plates 20 and the output-side rotary plates 22, or a slipper torque, which is a force to move the input-side rotary plates 20 and the output-side rotary plates 22 away from each other promptly so as to make a transition to a half-clutch state. As illustrated in FIG. 2, the center-side cam portions 60 protrude in the second direction D2 from a surface 43D2 of the base wall 43 located in the second direction D2. As illustrated in FIG. 3, the center-side cam portions 60 are provided at equal or substantially equal intervals in the circumferential direction S of the clutch center 40. In the present example embodiment, the number of center-side cam portions 60 included in the clutch center 40 is three, for example. The number of center-side cam portions 60, however, is not limited to three.

As illustrated in FIG. 3, the center-side cam portions 60 are radially outward of the output shaft holder 50. The center-side cam portions 60 include the center-side assist cam surfaces 60A and the center-side slipper cam surfaces 60S. The center-side assist cam surfaces 60A are configured to, upon being rotated relative to the pressure plate 70, produce a force in a direction in which the pressure plate 70 is moved toward the clutch center 40 so as to increase the pushing force (or pressing force) for the input-side rotary plates 20 and the output-side rotary plates 22. In the present example embodiment, when the force is produced, the position of the pressure plate 70 relative to the clutch center 40 remains unchanged, making it unnecessary for the pressure plate 70 to physically move toward the clutch center 40. Alternatively, the pressure plate 70 may physically move relative to the clutch center 40. The center-side slipper cam surfaces 60S are configured to, upon being rotated relative to the pressure plate 70, move the pressure plate 70 away from the clutch center 40 so as to reduce the pushing force (or pressing force) for the input-side rotary plates 20 and the output-side rotary plates 22. The center-side assist cam surface 60A of a first center-side cam portion 60L, which is one of the center-side cam portions 60 adjacent to each other in the circumferential direction S, and the center-side slipper cam surface 60S of a second center-side cam portion 60M, which is another one of the center-side cam portions 60 adjacent to each other in the circumferential direction S, face each other in the circumferential direction S.

As illustrated in FIG. 2, the clutch center 40 includes the bosses 54 (the number of which is three in the present example embodiment, for example). The bosses 54 support the pressure plate 70. The bosses 54 are provided at equal or substantially equal intervals in the circumferential direction S. The bosses 54 each have a cylindrical or substantially cylindrical shape. The bosses 54 are radially outward of the output shaft holder 50. The bosses 54 extend toward the pressure plate 70 (i.e., in the second direction D2). The bosses 54 are provided on the base wall 43. The bosses 54 are provided with threaded holes 54H into which bolts 28 (see FIG. 1) are inserted. The threaded holes 54H extend in the axial direction of the clutch center 40.

As illustrated in FIG. 2, the center-side fitting portion 58 is radially outward of the output shaft holder 50. The center-side fitting portion 58 is radially outward of the center-side cam portions 60. The center-side fitting portion 58 is located in the second direction D2 relative to the center-side cam portions 60. The center-side fitting portion 58 is provided on an inner peripheral surface of the outer peripheral wall 45. The center-side fitting portion 58 is configured to be externally fitted to an after-mentioned pressure-side fitting portion 88 (see FIG. 6) so as to be slidable thereon. The center-side fitting portion 58 has an inner diameter falling within a fitting tolerance that allows clutch oil flowing out of an extremity 15T of the output shaft 15 to flow between the center-side fitting portion 58 and the pressure-side fitting portion 88. In other words, the center-side fitting portion 58 and the pressure-side fitting portion 88 (which will be described below) have a clearance therebetween. In the present example embodiment, the center-side fitting portion 58 has, for example, an inner diameter larger than an outer diameter of the pressure-side fitting portion 88 by 0.1 mm. A dimensional tolerance between the inner diameter of the center-side fitting portion 58 and the outer diameter of the pressure-side fitting portion 88 may be suitably set in accordance with the amount of clutch oil to be flowed, and may be, for example, between 0.1 mm and 0.5 mm inclusive.

As illustrated in FIGS. 2 and 3, the clutch center 40 includes the center-side cam holes 43H each extending through a portion of the base wall 43. The center-side cam holes 43H are each an example of a through hole. The center-side cam holes 43H extend through the base wall 43 in the direction D. The center-side cam holes 43H each extend to the outer peripheral wall 45 from a position laterally of the output shaft holder 50. The center-side cam holes 43H are located between adjacent ones of the center-side cam portions 60. The center-side cam holes 43H are provided between the center-side assist cam surfaces 60A of the center-side cam portions 60 and the bosses 54. As viewed in the axial direction of the clutch center 40, the center-side assist cam surfaces 60A and portions of the center-side cam holes 43H overlap with each other. The center-side cam holes 43H allow communication between the inside and outside of the clutch center 40. The center-side cam holes 43H are configured to guide clutch oil, which has flowed out of the output shaft 15, into the clutch center 40. More specifically, clutch oil that has flowed out of the output shaft 15 toward the clutch center 40 flows into the clutch center 40 through the center-side cam holes 43H as indicated by an arrow FS in FIG. 1. The center-side cam holes 43H are in communication with the oil discharge holes 49.

Figure 4:
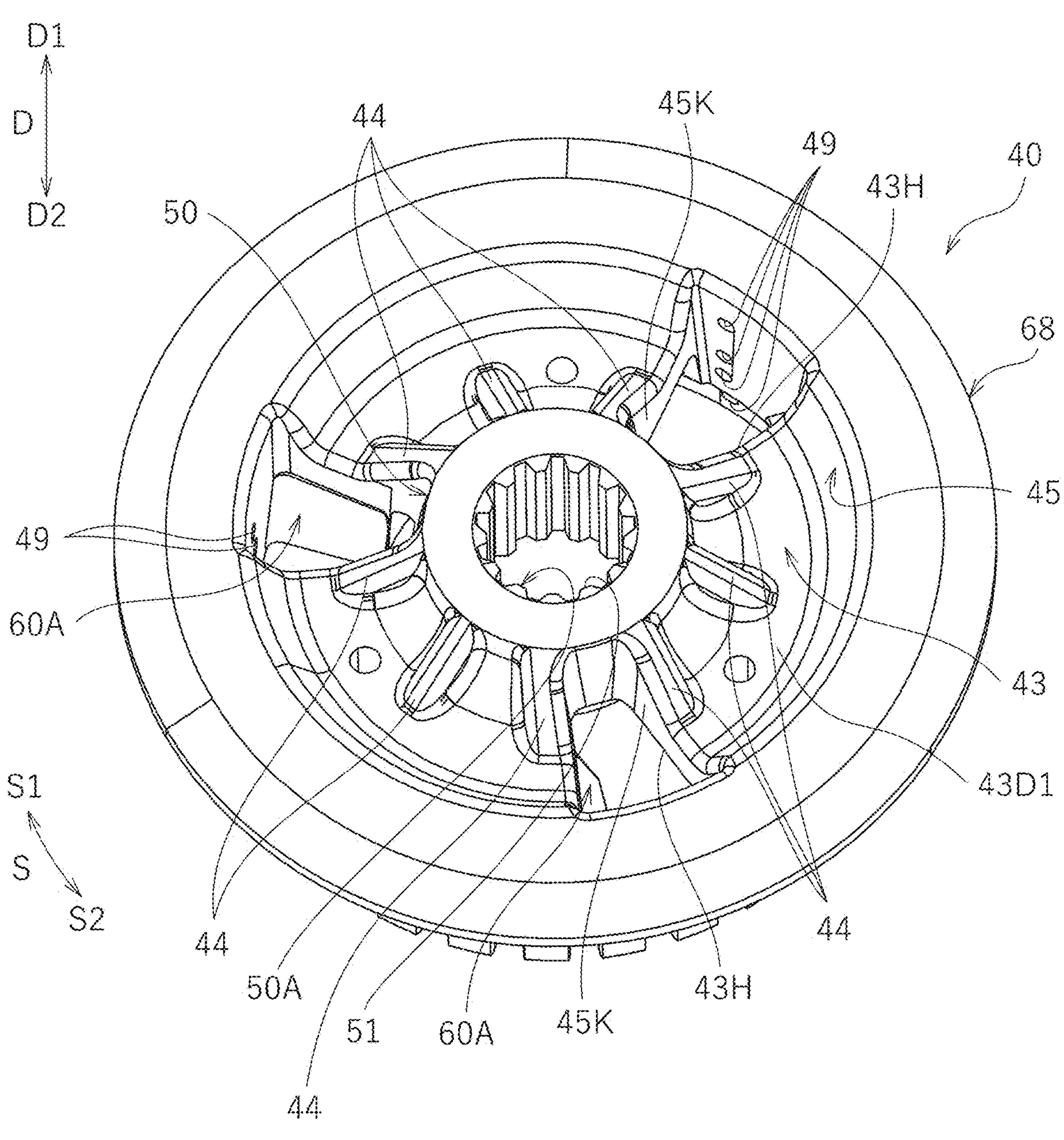
FIG. 4 is a perspective view of a clutch center according to an example embodiment of the present invention.
Figure 5:
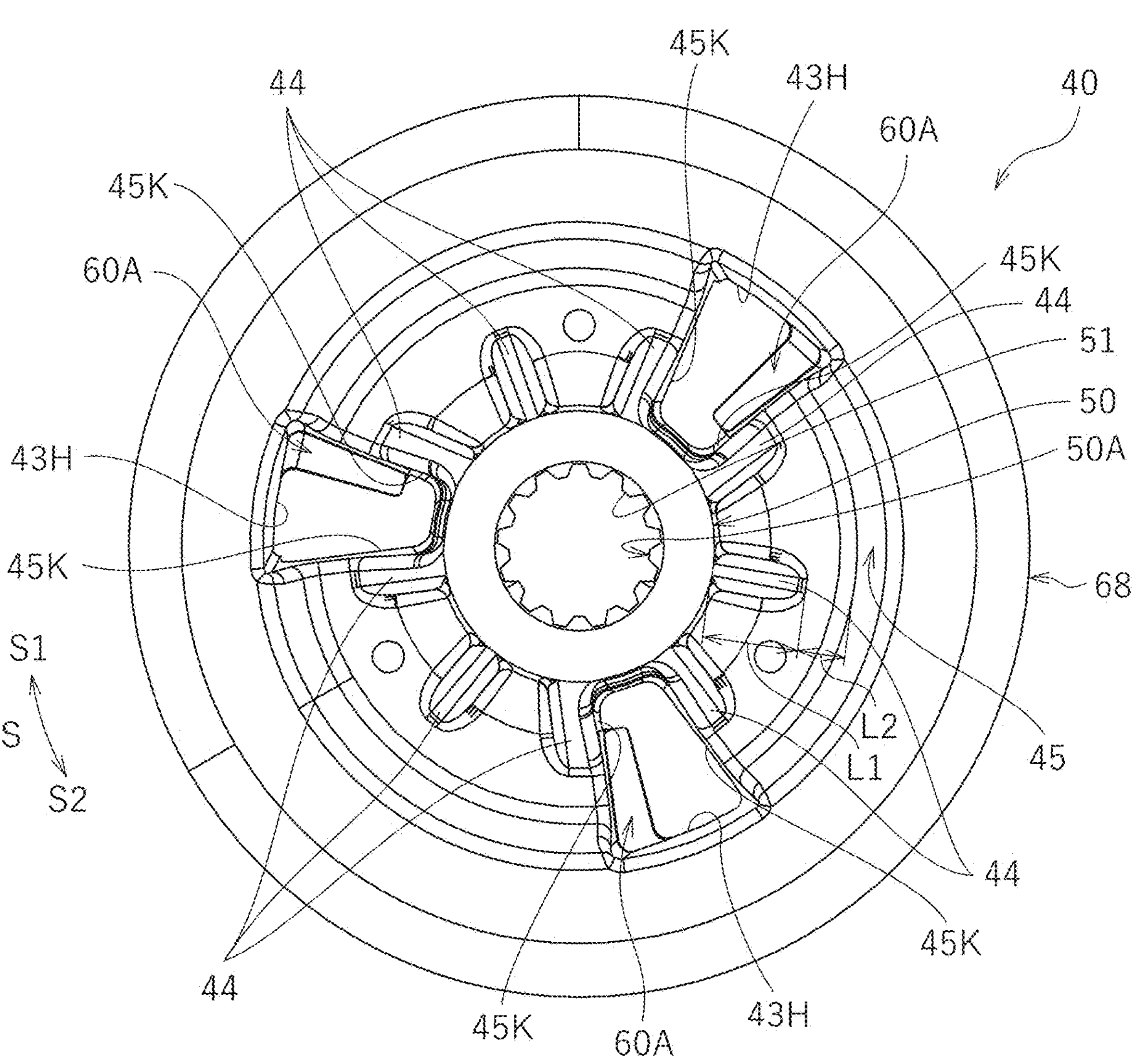
FIG. 5 is a plan view of a clutch center according to an example embodiment of the present invention.

As illustrated in FIGS. 4 and 5, the clutch center 40 includes ribs 44 extending in the first direction D1 from a surface 43D1 of the base wall 43 located in the first direction D1. The ribs 44 are connected to the output shaft holder 50. The ribs 44 incline radially inward as the ribs 44 extend in the first direction D1. The ribs 44 and the outer peripheral wall 45 are spaced away from each other in a radial direction. In other words, a clearance is created between each rib 44 and the outer peripheral wall 45 in the radial direction. A length L1 of each rib 44 in the radial direction is longer than a distance L2 between each rib 44 and the outer peripheral wall 45. As illustrated in FIG. 4, defining surfaces 45K of the base wall 43 defining the center-side cam holes 43H are flush with the ribs 44. In other words, the defining surfaces 45K and the ribs 44 have no steps on their boundaries and are integral with each other. In this example embodiment, the defining surfaces 45K are surfaces extending radial direction and the direction D.

As illustrated in FIG. 1, the pressure plate 70 is movable toward or away from the clutch center 40 and rotatable relative to the clutch center 40. The pressure plate 70 is configured to be able to push the input-side rotary plates 20 and the output-side rotary plates 22. The pressure plate 70 is disposed concentrically with the clutch center 40 and the clutch housing 30. The pressure plate 70 includes a body 72 and a flange 98 connected to an outer peripheral edge of the body 72, which is located in the second direction D2, and extending radially outward. The body 72 protrudes in the first direction DI relative to the flange 98. The flange 98 is radially outward of an after-mentioned tubular portion 80 (see FIG. 6). The pressure plate 70 holds the output-side rotary plates 22 disposed alternately with the input-side rotary plates 20. The flange 98 is configured to be able to push the input-side rotary plates 20 and the output-side rotary plates 22.

Figure 6:
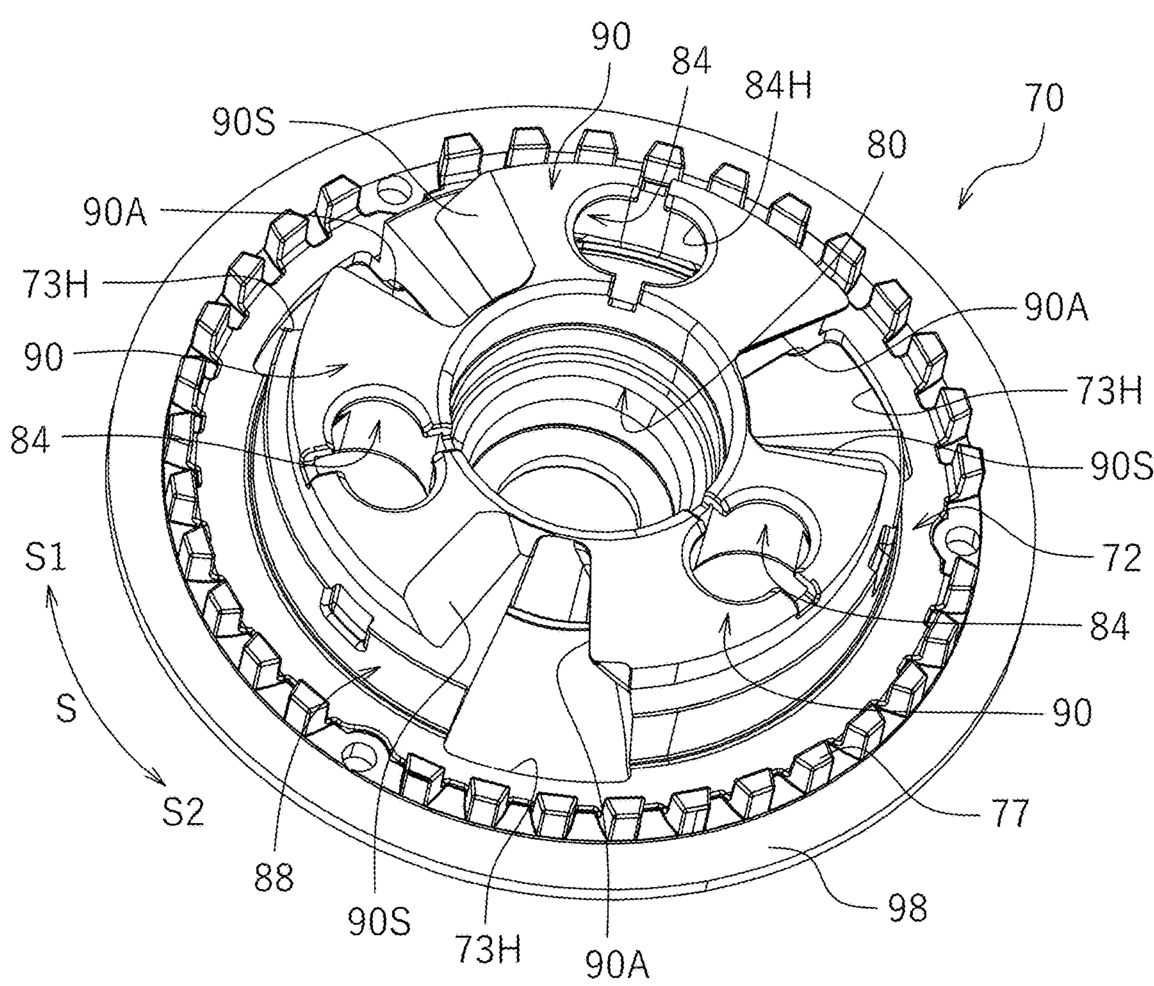
FIG. 6 is a perspective view of a pressure plate according to an example embodiment of the present invention.
Figure 8:
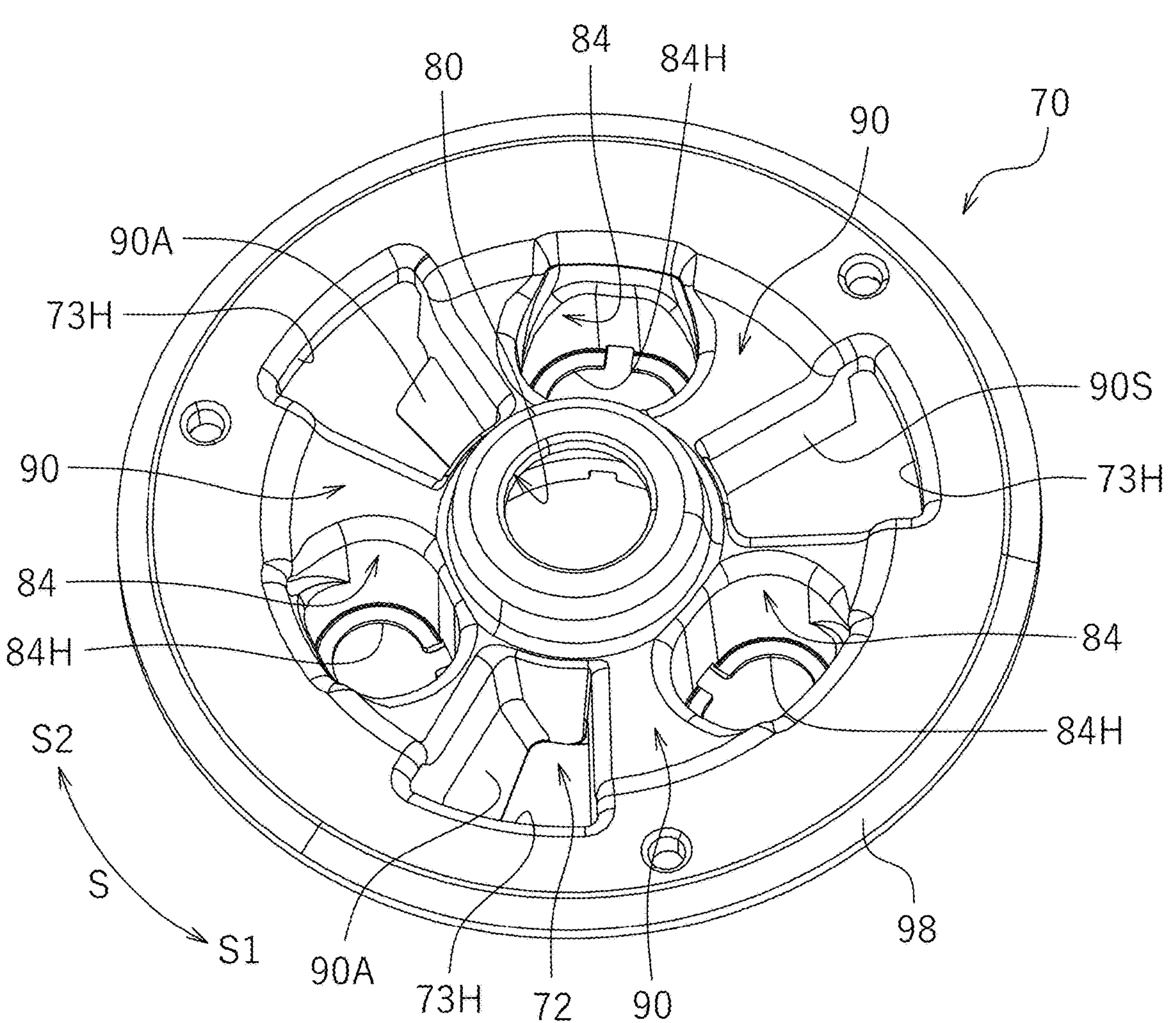
FIG. 8 is a perspective view of a pressure plate according to an example embodiment of the present invention.

As illustrated in FIG. 6, the body 72 includes the tubular portion 80, the pressure-side cam portions 90, the pressure-side fitting portion 88, and spring housing portions 84 (see also FIG. 8).

The tubular portion 80 has a cylindrical or substantially cylindrical shape. The tubular portion 80 is integral with the pressure-side cam portions 90. The tubular portion 80 houses the extremity 15T (see FIG. 1) of the output shaft 15. The release bearing 18 (see FIG. 1) is housed in the tubular portion 80. The tubular portion 80 is a region to receive a pushing force from the pushed body 16B. The tubular portion 80 is a region to receive clutch oil that has flowed out of the extremity 15T of the output shaft 15.

Figure 7:
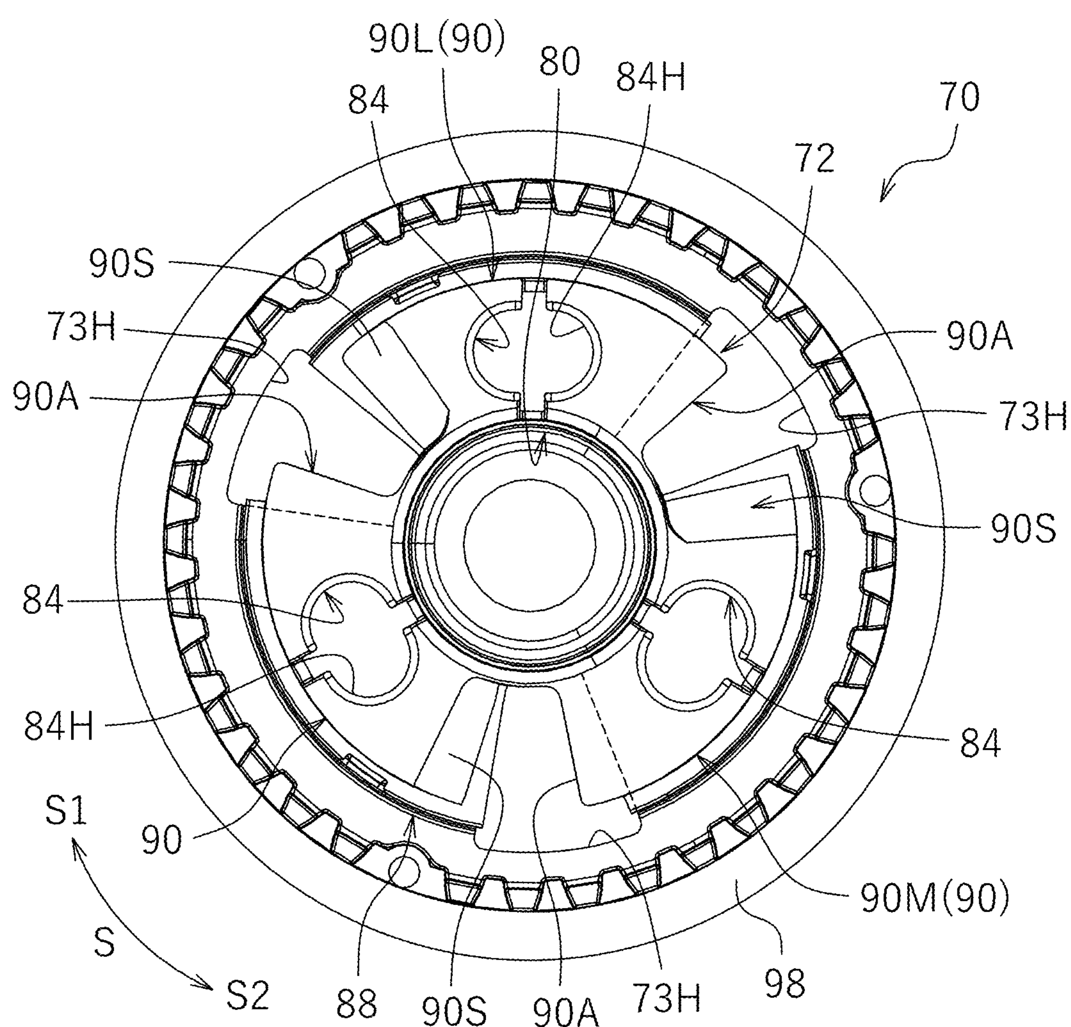
FIG. 7 is a plan view of a pressure plate according to an example embodiment of the present invention.

The pressure-side cam portions 90 are each in the shape of a block with cam surfaces that are inclined surfaces included in an assist & slipper (registered trademark) mechanism that slides relative to the center-side cam portions 60 so as to produce an assist torque or a slipper torque. The pressure-side cam portions 90 protrude in the first direction DI relative to the flange 98. As illustrated in FIG. 7, the pressure-side cam portions 90 are provided at equal or substantially equal intervals in the circumferential direction S of the pressure plate 70. In the present example embodiment, the number of pressure-side cam portions 90 included in the pressure plate 70 is three, for example. The number of pressure-side cam portions 90, however, is not limited to three.

As illustrated in FIG. 7, the pressure-side cam portions 90 are radially outward of the tubular portion 80. The pressure-side cam portions 90 include pressure-side assist cam surfaces 90A (see also FIG. 9) and pressure-side slipper cam surfaces 90S. The pressure-side assist cam surfaces 90A are configured to be able to come into contact with the center-side assist cam surfaces 60A. The pressure-side assist cam surfaces 90A are configured to, upon being rotated relative to the clutch center 40, produce a force in a direction in which the pressure plate 70 is moved toward the clutch center 40 so as to increase the pushing force (or pressing force) for the input-side rotary plates 20 and the output-side rotary plates 22. The pressure-side slipper cam surfaces 90S are configured to be able to come into contact with the center-side slipper cam surfaces 60S. The pressure-side slipper cam surfaces 90S are configured to, upon being rotated relative to the clutch center 40, move the pressure plate 70 away from the clutch center 40 so as to reduce the pushing force (or pressing force) for the input-side rotary plates 20 and the output-side rotary plates 22. The pressure-side assist cam surface 90A of a first pressure-side cam portion 90L, which is one of the pressure-side cam portions 90 adjacent to each other in the circumferential direction S, and the pressure-side slipper cam surface 90S of a second pressure-side cam portion 90M, which is another one of the pressure-side cam portions 90 adjacent to each other in the circumferential direction S, face each other in the circumferential direction S.

Figure 11A:
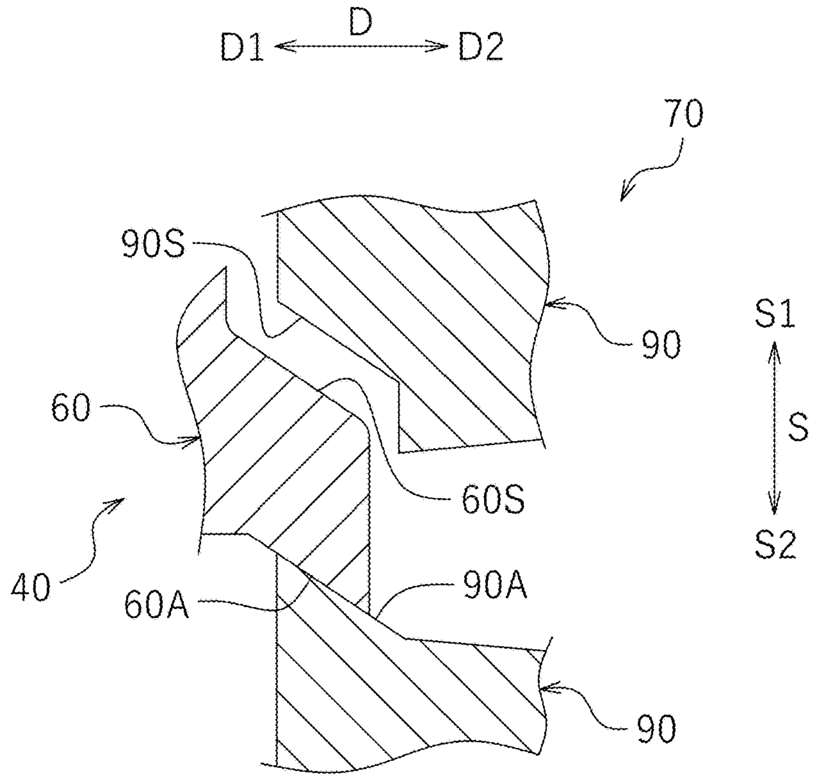
FIG. 11A is a schematic diagram illustrating actions of a center-side assist cam surface and a pressure-side assist cam surface.

Actions of the center-side cam portions 60 and the pressure-side cam portions 90 will be described below. When the engine is increased in rotational speed such that a rotational driving force input to the input gear 35 and the clutch housing 30 is transmittable to the output shaft 15 through the clutch center 40, a rotational force is applied to the pressure plate 70 in the first circumferential direction S1 as illustrated in FIG. 11A. Thus, actions of the center-side assist cam surfaces 60A and the pressure-side assist cam surfaces 90A apply a force to the pressure plate 70 in the first direction D1. This increases the pressing force for the input-side rotary plates 20 and the output-side rotary plates 22.

Figure 11B:
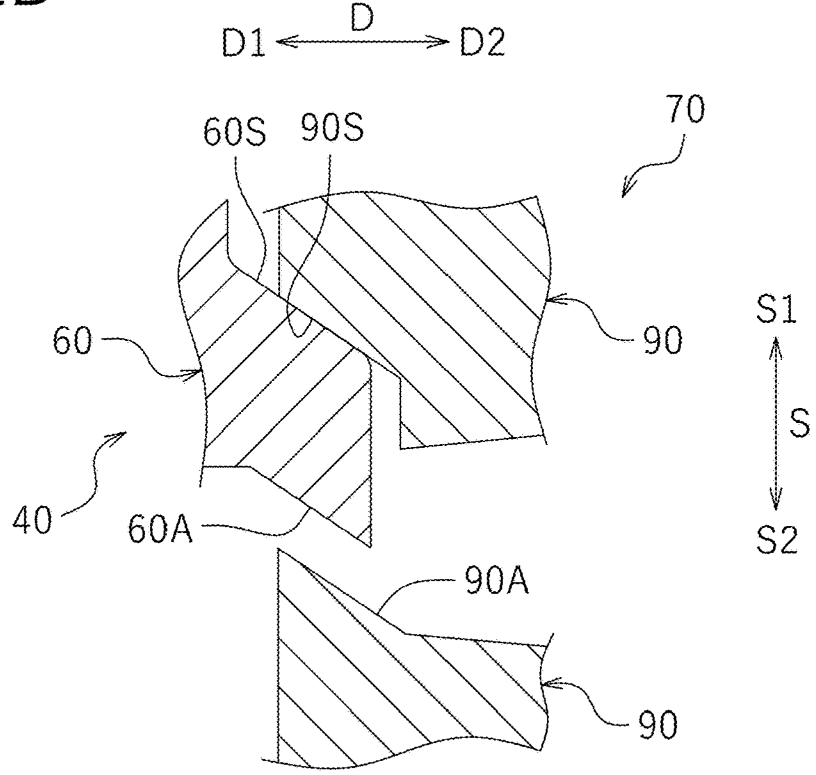
FIG. 11B is a schematic diagram illustrating actions of a center-side slipper cam surface and a pressure-side slipper cam surface.

When the output shaft 15 is higher in rotational speed than the input gear 35 and the clutch housing 30 such that a back torque is produced, a rotational force is applied to the clutch center 40 in the first circumferential direction S1 as illustrated in FIG. 11B. Thus, actions of the center-side slipper cam surfaces 60S and the pressure-side slipper cam surfaces 90S move the pressure plate 70 in the second direction D2 so as to release the pressing force for the input-side rotary plates 20 and the output-side rotary plates 22. This makes it possible to prevent the engine and/or the transmission from encountering a malfunction caused by the back torque.

As illustrated in FIG. 6, the pressure-side fitting portion 88 is radially outward of the pressure-side cam portions 90. The pressure-side fitting portion 88 is located in the second direction D2 relative to the pressure-side cam portions 90. The pressure-side fitting portion 88 is configured to be internally fitted to the center-side fitting portion 58 (see FIG. 2) so as to be slidable thereon.

Figure 9:
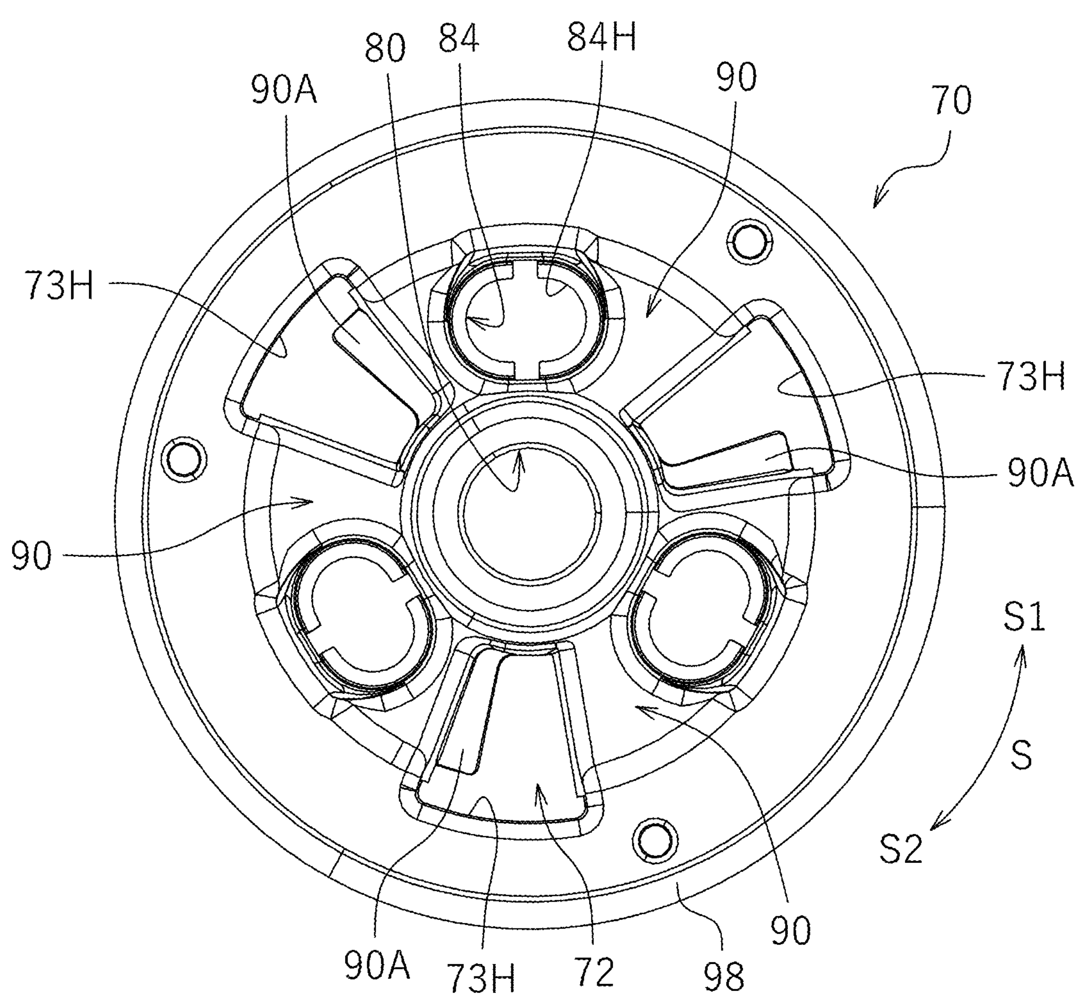
FIG. 9 is a plan view of a pressure plate according to an example embodiment of the present invention.

As illustrated in FIGS. 6 and 7, the pressure plate 70 includes pressure-side cam holes 73H extending through portions of the body 72 and the flange 98. The pressure-side cam holes 73H are radially outward of the tubular portion 80. The pressure-side cam holes 73H each extend radially outward of the pressure-side fitting portion 88 from a position laterally of the tubular portion 80. The pressure-side cam holes 73H are provided between the pressure-side assist cam surfaces 90A and the pressure-side slipper cam surfaces 90S of the pressure-side cam portions 90 adjacent to each other. As illustrated in FIGS. 7 and 9, the pressure-side assist cam surfaces 90A and portions of the pressure-side cam holes 73H overlap with each other as viewed in the axial direction of the pressure plate 70.

As illustrated in FIG. 6, the pressure plate 70 includes the pressure-side fitting teeth 77 disposed on the flange 98. The pressure-side fitting teeth 77 hold the output-side rotary plates 22. The pressure-side fitting teeth 77 protrude in the first direction D1 from the flange 98. The pressure-side fitting teeth 77 are radially outward of the tubular portion 80. The pressure-side fitting teeth 77 are radially outward of the pressure-side cam portions 90. The pressure-side fitting teeth 77 are radially outward of the pressure-side fitting portion 88. The pressure-side fitting teeth 77 are arranged in the circumferential direction S. The pressure-side fitting teeth 77 are provided at equal or substantially equal intervals in the circumferential direction S. In the present example embodiment, not all of the pressure-side fitting teeth 77 are provided at equal or substantially equal intervals, but some of the pressure-side fitting teeth 77 are provided at larger intervals than the other pressure-side fitting teeth 77 adjacent to each other and provided at equal or substantially equal intervals.

As illustrated in FIGS. 8 and 9, the spring housing portions 84 are provided in the pressure-side cam portions 90. The spring housing portions 84 are recessed in the first direction D1 from the second direction D2. The spring housing portions 84 each have an elliptic shape. The spring housing portions 84 house pressure springs 25 (see FIG. 1). The spring housing portions 84 are provided with insertion holes 84H which pass therethrough and into which the bosses 54 (see FIG. 2) are inserted. In other words, the insertion holes 84H pass through the pressure-side cam portions 90. The insertion holes 84H each have an elliptic shape.

As illustrated in FIG. 1, the pressure springs 25 are housed in the spring housing portions 84. The pressure springs 25 are held by the bosses 54 inserted into the insertion holes 84H of the spring housing portions 84. The pressure springs 25 urge the pressure plate 70 toward the clutch center 40 (i.e., in the first direction D1). The pressure springs 25 are, for example, coil springs provided by spirally winding spring steel.

Figure 10:
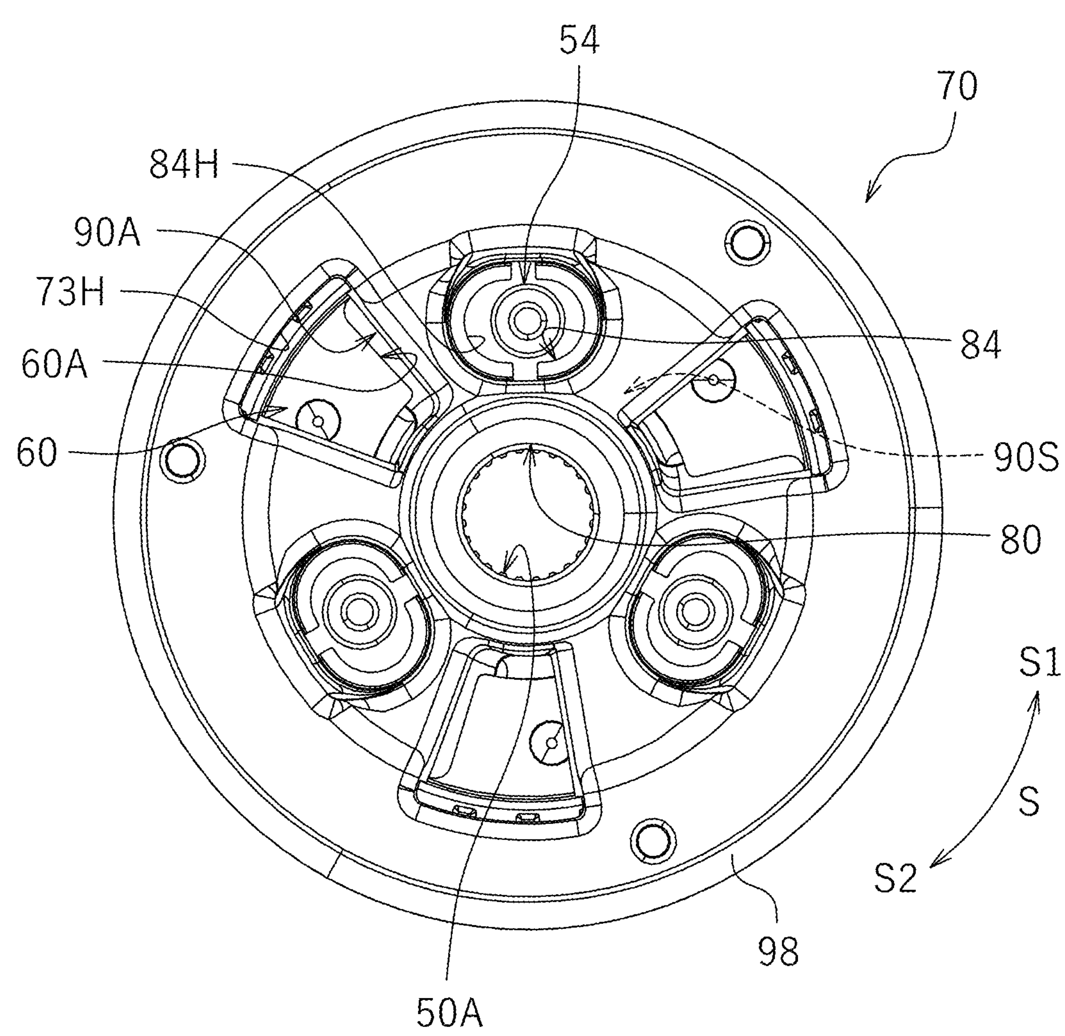
FIG. 10 is a plan view of a clutch center and a pressure plate according to an example embodiment of the present invention, which are in an assembled state.

FIG. 10 is a plan view of the clutch center 40 and the pressure plate 70 in an assembled state. In the state illustrated in FIG. 10, the pressure-side assist cam surfaces 90A and the center-side assist cam surfaces 60A are out of contact with each other, and the pressure-side slipper cam surfaces 90S and the center-side slipper cam surfaces 60S are out of contact with each other. In this state, the pressure plate 70 is at its closest position to the clutch center 40.

As illustrated FIG. 1, the stopper plate 100 is able to come into contact with the pressure plate 70. The stopper plate 100 is a component to prevent the pressure plate 70 from moving away from the clutch center 40 in the second direction D2 by a predetermined distance or more. The stopper plate 100 is secured to the bosses 54 of the clutch center 40 with the bolts 28. With the bosses 54 of the clutch center 40 and the pressure springs 25 being disposed in the spring housing portions 84 of the pressure plate 70, the bolts 28 are tightened and secured into the bosses 54 through the stopper plate 100. The stopper plate 100 has a substantially triangular shape in a plan view.

When the pressure plate 70 is in contact with the stopper plate 100, the area of contact between the pressure-side slipper cam surfaces 90S and the center-side slipper cam surfaces 60S corresponds to, for example, 50% to 90% (inclusive) of the area of the pressure-side slipper cam surfaces 90S and 50% to 90% (inclusive) of the area of the center-side slipper cam surfaces 60S. When the pressure plate 70 is in contact with the stopper plate 100, the pressure springs 25 are located away from side walls of the spring housing portions 84. This means that the pressure springs 25 are not located between the bosses 54 and the spring housing portions 84, which prevents application of excessive stress to the bosses 54.

The inside of the clutch apparatus 10 is filled with a predetermined amount of clutch oil. The clutch oil flows into the clutch center 40 and the pressure plate 70 through the hollow portion 15H of the output shaft 15 and is then supplied to the input-side rotary plates 20 and the output-side rotary plates 22 through the clearance between the center-side fitting portion 58 and the pressure-side fitting portion 88 and the oil discharge holes 49. The clutch oil prevents heat absorption and/or wearing of the friction materials. The clutch apparatus 10 according to the present example embodiment is a "wet multiplate friction clutch apparatus".

The following description discusses operations of the clutch apparatus 10 according to the present example embodiment. As previously mentioned, the clutch apparatus 10 is disposed between the engine and the transmission of the motorcycle. Operations performed on the clutch operation lever by a driver transmit the rotational driving force of the engine to the transmission and cut off the rotational driving force.

When the clutch operation lever is not being operated by the driver of the motorcycle, a clutch release mechanism (not illustrated) of the clutch apparatus 10 does not push the push rod 16A, so that the pressure plate 70 pushes the input-side rotary plates 20 with an urging force (or elastic force) of the pressure springs 25. This brings the clutch center 40 to a clutch ON state in which the input-side rotary plates 20 and the output-side rotary plates 22 are pushed against each other and frictionally connected to each other, with the result that the clutch center 40 is rotationally driven. In this case, the rotational driving force of the engine is transmitted to the clutch center 40 so as to rotationally drive the output shaft 15.

In the clutch ON state, clutch oil that has flowed through the hollow portion H of the output shaft 15 and flowed out of the extremity 15T of the output shaft 15 moves down inside the tubular portion 80 or moves up and adheres to the inside of the tubular portion 80 (see arrows F in FIG. 1). The clutch oil adhering to the inside of the tubular portion 80 is guided into the clutch center 40. The clutch oil thus flows out of the clutch center 40 through the oil discharge holes 49. The clutch oil also flows out of the clutch center 40 through the clearance between the center-side fitting portion 58 and the pressure-side fitting portion 88. The clutch oil that has flowed out of the clutch center 40 is supplied to the input-side rotary plates 20 and the output-side rotary plates 22.

When the clutch operation lever is operated by the driver of the motorcycle in the clutch ON state, the clutch release mechanism (not illustrated) of the clutch apparatus 10 pushes the push rod 16A, so that the pressure plate 70 is moved in a direction away from the clutch center 40 (i.e., in the second direction D2) against the urging force of the pressure springs 25. This brings the clutch center 40 to a clutch OFF state in which the input-side rotary plates 20 and the output-side rotary plates 22 are released from being frictionally connected to each other, with the result that rotational driving of the clutch center 40 is damped or stopped. In this case, transmission of the rotational driving force of the engine to the clutch center 40 is cut off.

In the clutch OFF state, clutch oil that has flowed through the hollow portion H of the output shaft 15 and flowed out of the extremity 15T of the output shaft 15 is guided into the clutch center 40 as in the clutch ON state. In this case, the pressure plate 70 moves away from the clutch center 40, which reduces the area where the center-side fitting portion 58 and the pressure-side fitting portion 88 are fitted to each other. As a result, clutch oil inside the tubular portion 80 flows out of the clutch center 40 more proactively and flows to each region inside the clutch apparatus 10. Clutch oil is proactively guidable to, in particular, gaps between the input-side rotary plates 20 and the output-side rotary plates 22 spaced away from each other.

Upon releasing of the clutch operation lever by the driver in the clutch OFF state, the pressure plate 70 is released from being pushed by the clutch release mechanism (not illustrated) through the pushed body 16B. This causes the pressure plate 70 to move in a direction toward the clutch center 40 (i.e., the first direction D1) with the urging force of the pressure springs 25.

In the clutch apparatus 10 according to the present example embodiment, the clutch center 40 includes, as described above, the ribs 44 extending in the first direction D1 from the surface 43D1 of the base wall 43, which is located in the first direction D1, and connected to the output shaft holder 50. This enhances the rigidity of the output shaft holder 50 so as to enable the output shaft holder 50 to have bending rigidity to withstand rotation of the output shaft 15. The ribs 44 and the outer peripheral wall 45 are spaced away from each other in the radial direction. Thus, clutch oil that has been moved toward the outer peripheral wall 45 by a centrifugal force produced upon rotation of the clutch center 40 is allowed to smoothly move along the surface 43D1 of the base wall 43 located in the first direction D1 without being inhibited by the ribs 44. The clutch oil is then guidable into the clutch center 40 through the center-side cam holes 43H provided in the base wall 43.

In the clutch apparatus 10 according to the present example embodiment, the clutch center 40 includes the center-side cam portions 60 protruding in the second direction D2 from the surface 43D2 of the base wall 43 located in the second direction D2. The center-side cam portions 60 include the center-side assist cam surfaces 60A to, upon being rotated relative to the pressure plate 70, produce a force in the direction in which the pressure plate 70 is moved toward the clutch center 40 (i.e., the first direction D1) so as to increase the pushing force for the input-side rotary plates 20 and the output-side rotary plates 22. The above-described example embodiment is able to produce an assist torque, which is a force to increase the pushing force for the input-side rotary plates 20 and the output-side rotary plates 22.

In the clutch apparatus 10 according to the present example embodiment, the center-side cam portions 60 include the center-side slipper cam surfaces 60S to move the pressure plate 70 away from the clutch center 40 so as to reduce the pushing force for the input-side rotary plates 20 and the output-side rotary plates 22. The above-described example embodiment is able to produce a slipper torque, which is a force to reduce the pushing force for the input-side rotary plates 20 and the output-side rotary plates 22.

In the clutch apparatus 10 according to the present example embodiment, the defining surfaces 45K of the base wall 43 defining the center-side cam holes 43H are flush with the ribs 44. The above-described example embodiment is able to prevent clutch oil from being collected between the ribs 44 and the surface 43D1 of the base wall 43 located in the first direction D1.

In the clutch apparatus 10 according to the present example embodiment, the clutch center 40 includes the oil discharge holes 49 which are provided through the outer peripheral wall 45 and through which clutch oil that has flowed out of the output shaft 15 is to be discharged out of the clutch center 40. The oil discharge holes 49 are radially outward of the center-side cam holes 43H. The above-described example embodiment is able to allow clutch oil guided into the clutch center 40 through the center-side cam holes 43H to be effectively discharged out of the clutch center 40 through the oil discharge holes 49.

In the clutch apparatus 10 according to the present example embodiment, the length L1 of each rib 44 in the radial direction is longer than the distance L2 between each rib 44 and the outer peripheral wall 45. The above-described example embodiment allows clutch oil to smoothly flow along the surface 43D1 of the base wall 43 located in the first direction D1 while allowing the output shaft holder 50 to have sufficient rigidity.

In the clutch apparatus 10 according to the present example embodiment, the ribs 44 incline radially inward as the ribs 44 extend in the first direction D1. The above-described example embodiment is able to prevent clutch oil from remaining between the ribs 44.

Second Example Embodiment

Figure 12:
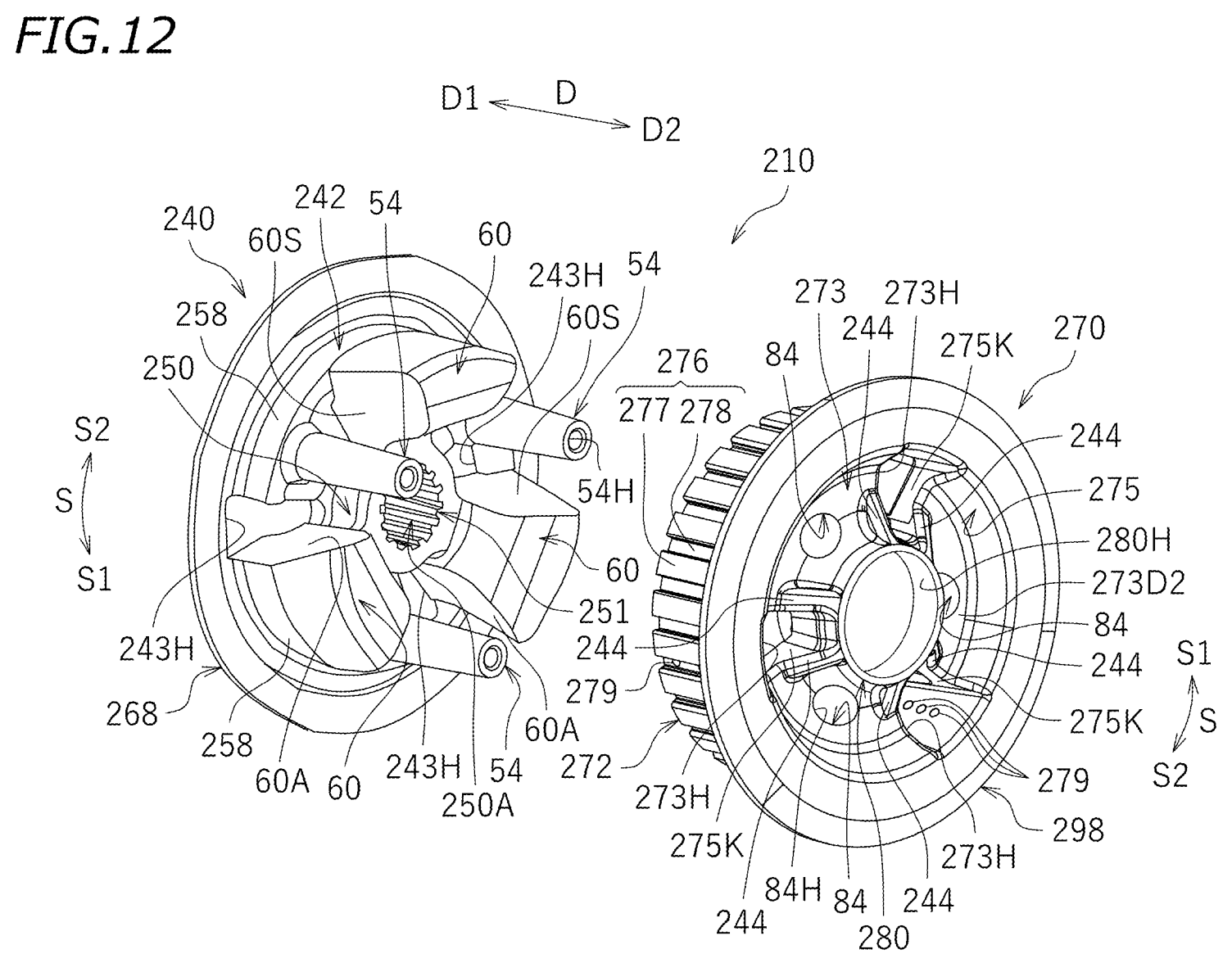

FIG. 12 is an exploded perspective view of a clutch center 240 and a pressure plate 270 of a clutch apparatus 210 according to a second example embodiment of the present invention.

The clutch center 240 is housed in a clutch housing 30 (see FIG. 1). The clutch center 240 is disposed concentrically with the clutch housing 30. As illustrated in FIG. 12, the clutch center 240 includes a body 242 and a flange 268 connected to an outer peripheral edge of the body 242, which is located in a first direction D1, and extending radially outward. The body 242 protrudes in a second direction D2 relative to the flange 268. The clutch center 240 does not hold output-side rotary plates 22. The clutch center 240 is rotationally driven together with an output shaft 15 (see FIG. 1).

As illustrated in FIG. 12, the body 242 includes an output shaft holder 250, center-side cam portions 60, and a center-side fitting portion 258. The center-side cam portions 60 protrude in the second direction D2 relative to the flange 268. The center-side cam portions 60 are radially outward of the output shaft holder 250.

The output shaft holder 250 has a cylindrical or substantially cylindrical shape. The output shaft holder 250 is provided with an insertion hole 251 into which the output shaft 15 (see FIG. 1) is inserted and spline-fitted. The insertion hole 251 extends through the body 242. An inner peripheral surface 250A of the output shaft holder 250, which defines the insertion hole 251, is provided with spline grooves extending in its axial direction. The output shaft 15 is connected to the output shaft holder 250.

As illustrated in FIG. 12, the clutch center 240 includes bosses 54 (the number of which is three in the present example embodiment, for example). The bosses 54 are radially outward of the output shaft holder 250. The bosses 54 are provided on the body 242.

As illustrated in FIG. 12, the clutch center 240 includes center-side cam holes 243H extending through portions of the body 242 and the flange 268. The center-side cam holes 243H pass through the body 242 and the flange 268 in a direction D. The center-side cam holes 243H each extend to the flange 268 from a position laterally of the output shaft holder 250. £ The center-side cam holes 243H are provided between center-side assist cam surfaces 60A of the center-side cam portions 60 and the bosses 54. As viewed in an axial direction of the clutch center 240, the center-side assist cam surfaces 60A and portions of the center-side cam holes 243H overlap with each other.

As illustrated in FIG. 12, the center-side fitting portion 258 is provided on the body 242. The center-side fitting portion 258 is radially outward of the center-side cam portions 60. The center-side fitting portion 258 is located in the first direction D1 relative to the center-side cam portions 60. The center-side fitting portion 258 is configured to be internally fitted to a pressure-side fitting portion 288 (see FIG. 13) so as to be slidable thereon.

As illustrated in FIG. 12, the pressure plate 270 is movable toward or away from the clutch center 240 and rotatable relative to the clutch center 240. The pressure plate 270 is configured to be able to push input-side rotary plates 20 and the output-side rotary plates 22. The pressure plate 270 is disposed concentrically with the clutch center 240 and the clutch housing 30. The pressure plate 270 includes a cylindrical body 272 and a flange 298 extending radially outward from an outer peripheral edge of the body 272. The pressure plate 270 holds the output-side rotary plates 22 disposed alternately with the input-side rotary plates 20 in the direction D.

Figure 13:
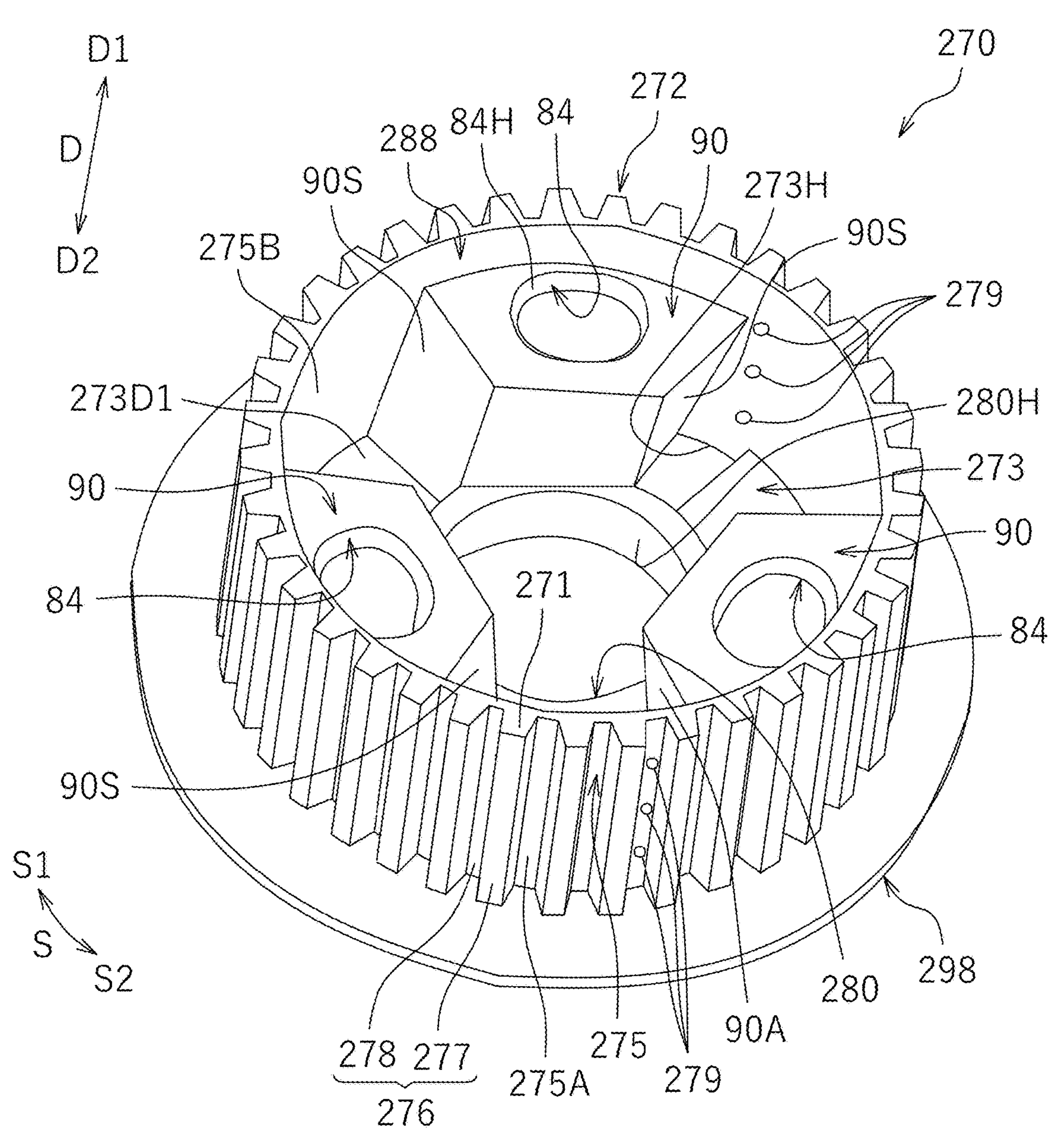
FIG. 13 is a perspective view of a pressure plate according to another example embodiment of the present invention.

As illustrated in FIG. 13, the body 272 includes an annular portion 280, an annular base wall 273 radially outward of the annular portion 280, an outer peripheral wall 275 radially outward of the base wall 273 and extending in the direction D (i.e., extending in the first direction DI from the base wall 273), pressure-side cam portions 90 connected to the base wall 273 and the outer peripheral wall 275, the pressure-side fitting portion 288, and spring housing portions 84 (see FIG. 12). The pressure-side cam portions 90 protrude in the first direction D1 from the body 272. The pressure-side cam portions 90 protrude in the first direction D1 from a surface 273D1 of the base wall 273 located in the first direction Dl.

The pressure-side cam portions 90 are radially outward of the annular portion 280. The pressure-side cam portions 90 are located radially inward of the outer peripheral wall 275.

The annular portion 280 is provided in a center of the body 272. The annular portion 280 is provided with a through hole 280H. The annular portion 280 is integral with the pressure-side cam portions 90. The annular portion 280 houses an extremity 15T (see FIG. 1) of the output shaft 15. A release bearing 18 (see FIG. 1) is housed in the annular portion 280. The annular portion 280 is a region to receive a pushing force from a pushed body 16B. The annular portion 280 is a region to receive clutch oil that has flowed out of the extremity 15T of the output shaft 15.

As illustrated in FIG. 13, the outer peripheral wall 275 of the pressure plate 270 is disposed radially outward of the annular portion 280. The outer peripheral wall 275 has an annular shape extending in the direction D. An outer peripheral surface 275A of the outer peripheral wall 275 is provided with a spline-fitting portion 276. The spline-fitting portion 276 includes pressure-side fitting teeth 277 extending in an axial direction of the pressure plate 270 along the outer peripheral surface 275A of the outer peripheral wall 275, spline grooves 278 provided between adjacent ones of the pressure-side fitting teeth 277 and extending in the axial direction of the pressure plate 270; and oil discharge holes 279. The pressure-side fitting teeth 277 hold the output-side rotary plates 22. The pressure-side fitting teeth 277 are arranged in a circumferential direction S. The pressure-side fitting teeth 277 are provided at equal or substantially equal intervals in the circumferential direction S. The pressure-side fitting teeth 277 are similar in shape. The pressure-side fitting teeth 277 protrude radially outward from the outer peripheral surface 275A of the outer peripheral wall 275. The oil discharge holes 279 are provided radially through the outer peripheral wall 275. The oil discharge holes 279 are provided between adjacent ones of the pressure-side fitting teeth 277. In other words, the oil discharge holes 279 are provided in the spline grooves 278. The oil discharge holes 279 are provided laterally of the pressure-side cam portions 90. The oil discharge holes 279 are provided laterally of pressure-side assist cam surfaces 90A of the pressure-side cam portions 90. The oil discharge holes 279 are provided in a first circumferential direction S1 relative to the pressure-side assist cam surfaces 90A. The oil discharge holes 279 are provided in a second circumferential direction S2 relative to pressure-side slipper cam surfaces 90S. The oil discharge holes 279 are radially outward of pressure-side cam holes 273H. In the present example embodiment, three of the oil discharge holes 279 are provided at each of three locations situated on the outer peripheral wall 275 in the circumferential direction S, for example. The oil discharge holes 279 are provided at equal or substantially equal intervals in the circumferential direction S. The oil discharge holes 279 allow communication between inside and outside of the pressure plate 270. The oil discharge holes 279 are holes through which clutch oil that has flowed out of the output shaft 15 into the pressure plate 270 is to be discharged out of the pressure plate 270. In this example embodiment, clutch oil flowing along an inner peripheral surface 275B of the outer peripheral wall 275 is discharged out of the pressure plate 270 through the oil discharge holes 279. At least portions of the oil discharge holes 279 are provided at positions facing the center-side fitting portion 258 (see FIG. 12).

The output-side rotary plates 22 are held by the spline-fitting portion 276 of the pressure plate 270. The output-side rotary plates 22 are held by the pressure-side fitting teeth 277 and the spline grooves 278 through spline-fitting. The output-side rotary plates 22 are movable in the axial direction of the pressure plate 270. The output-side rotary plates 22 are rotatable together with the pressure plate 270.

As illustrated in FIGS. 12 and 13, the pressure plate 270 includes the pressure-side cam holes 273H each extending through a portion of the base wall 273. The pressure-side cam holes 273H are each an example of the through hole. The pressure-side cam holes 273H pass through the base wall 273 in the direction D. The pressure-side cam holes 273H are radially outward of the annular portion 280. The pressure-side cam holes 273H each extend to the outer peripheral wall 275 from a position laterally of the annular portion 280. The pressure-side cam holes 273H are provided through the base wall 273 between the pressure-side cam portions 90 adjacent to each other. The pressure-side cam holes 273H are provided through the base wall 273 between the pressure-side assist cam surfaces 90A and the pressure-side slipper cam surfaces 90S of the pressure-side cam portions 90 adjacent to each other. As viewed in the axial direction of the pressure plate 270, the pressure-side assist cam surfaces 90A and portions of the pressure-side cam holes 273H overlap with each other. Clutch oil flows into the pressure-side cam holes 273H from outside the pressure plate 270.

As illustrated in FIG. 13, the pressure-side fitting portion 288 is radially outward of the annular portion 280. The pressure-side fitting portion 288 is radially outward of the pressure-side cam portions 90. The pressure-side fitting portion 288 is located in the first direction DI relative to the pressure-side cam portions 90. The pressure-side fitting portion 288 is provided on the inner peripheral surface 275B of the outer peripheral wall 275. The pressure-side fitting portion 288 is configured to be externally fitted to the center-side fitting portion 258 (see FIG. 12) so as to be slidable thereon. The pressure-side fitting portion 288 and the center-side fitting portion 258 have a clearance therebetween.

Figure 14:
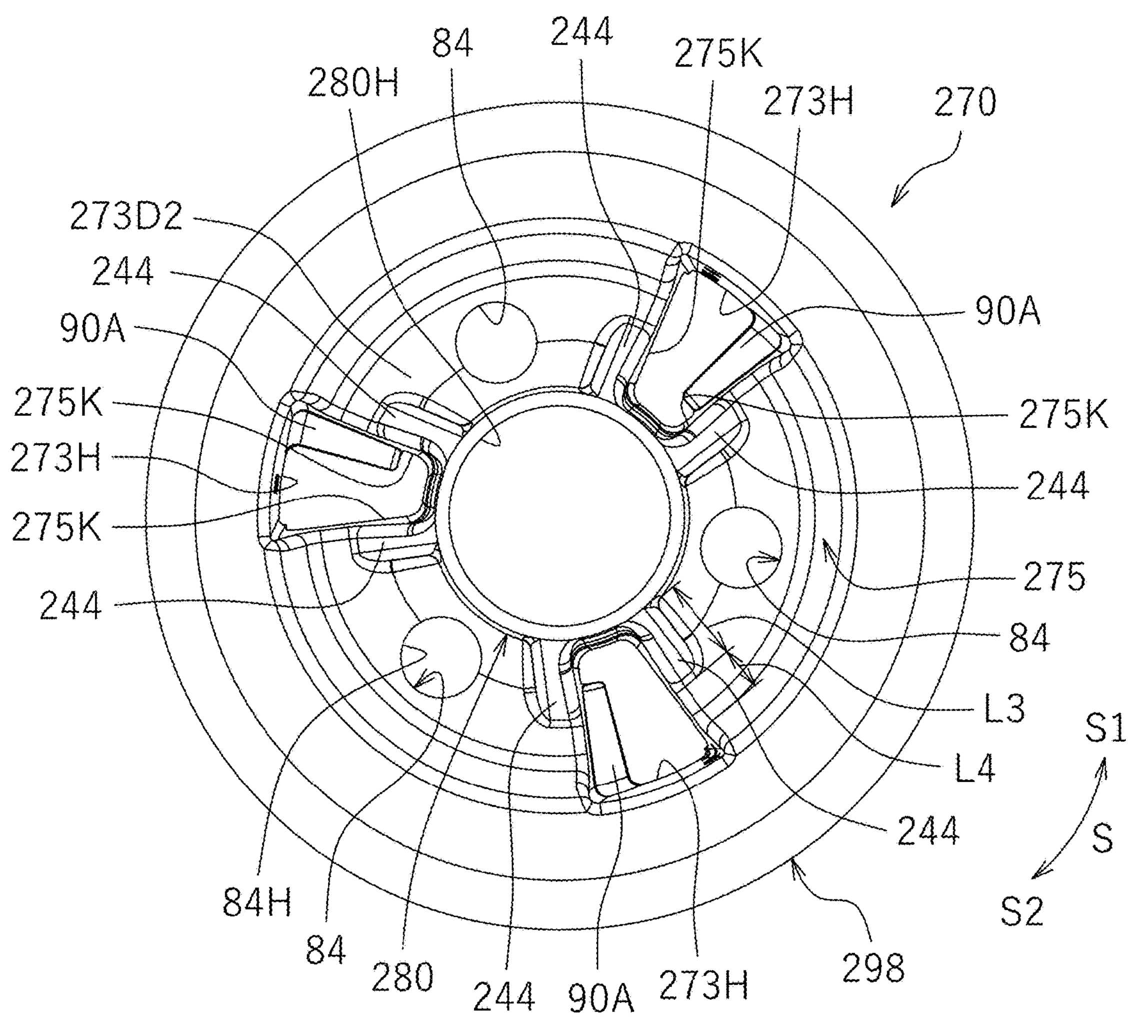
FIG. 14 is a plan view of a pressure plate according to another example embodiment of the present invention.

As illustrated in FIGS. 12 and 14, the pressure plate 270 includes ribs 244 extending in the second direction D2 from a surface 273D2 of the base wall 273 located in the second direction D2. The ribs 244 are connected to the annular portion 280. The ribs 244 incline radially inward as the ribs 244 extend in the second direction D2. The ribs 244 and the outer peripheral wall 275 are spaced away from each other in a radial direction. In other words, a clearance is created between each rib 244 and the outer peripheral wall 275 in the radial direction. A length L3 of each rib 244 in the radial direction is longer than a distance L4 between each rib 244 and the outer peripheral wall 275. As illustrated in FIG. 12, defining surfaces 275K of the base wall 273 defining the pressure-side cam holes 273H are flush with the ribs 244. In other words, the defining surfaces 275K and the ribs 244 have no steps on their boundaries and are integral with each other. In this example embodiment, the defining surfaces 275K are surfaces extending in the radial direction and the direction D.

In the clutch apparatus 210 according to the present example embodiment, the pressure plate 270 includes, as described above, the ribs 244 extending in the second direction D2 from the surface 273D2 of the base wall 273, which is located in the second direction D2, and connected to the annular portion 280. This enhances the rigidity of the annular portion 280 so as to enable the annular portion 280 to have sufficient bending rigidity. The ribs 244 and the outer peripheral wall 275 are spaced away from each other in the radial direction. Thus, clutch oil that has been moved toward the outer peripheral wall 275 by a centrifugal force produced upon rotation of the pressure plate 270 is allowed to smoothly move along the surface 273D2 of the base wall 273 located in the second direction D2 without being inhibited by the ribs 244. The clutch oil is then guidable into the pressure plate 270 through the pressure-side cam holes 273H provided in the base wall 273.

In the clutch apparatus 210 according to the present example embodiment, the pressure plate 270 includes the pressure-side cam portions 90 protruding in the first direction D1 from the surface 273D1 of the base wall 273 located in the first direction D1. The pressure-side cam portions 90 include the pressure-side assist cam surfaces 90A to, upon being rotated relative to the clutch center 240, produce a force in a direction in which the pressure plate 270 is moved toward the clutch center 240 (i.e., the first direction D1) so as to increase a pushing force for the input-side rotary plates 20 and the output-side rotary plates 22. The above-described example embodiment is able to produce an assist torque, which is a force to increase the pushing force for the input-side rotary plates 20 and the output-side rotary plates 22.

In the clutch apparatus 210 according to the present example embodiment, the pressure-side cam portions 90 include the pressure-side slipper cam surfaces 90S to move the pressure plate 270 away from the clutch center 240 so as to reduce the pushing force for the input-side rotary plates 20 and the output-side rotary plates 22. The above-described example embodiment is able to produce a slipper torque, which is a force to reduce the pushing force for the input-side rotary plates 20 and the output-side rotary plates 22.

In the clutch apparatus 210 according to the present example embodiment, faces (which are located in the second direction D2) of the defining surfaces 275K of the base wall 273 defining the pressure-side cam holes 273H Are Flush or substantially flush with faces of the ribs 244 located in the second direction D2. The above-described example embodiment is able to prevent clutch oil from being collected between the ribs 244 and the surface 273D2 of the base wall 273 located in the second direction D2.

In the clutch apparatus 210 according to the present example embodiment, the pressure plate 270 includes the oil discharge holes 279 which are provided through the outer peripheral wall 275 and through which clutch oil that has flowed out of the output shaft 15 is to be discharged out of the pressure plate 270. The oil discharge holes 279 are radially outward of the pressure-side cam holes 273H. The above-described example embodiment is able to allow clutch oil guided into the pressure plate 270 through the pressure-side cam holes 273H to be effectively discharged out of the pressure plate 270 through the oil discharge holes 279.

In the clutch apparatus 210 according to the present example embodiment, the length L3 of each rib 244 in the radial direction is longer than the distance L4 between each rib 244 and the outer peripheral wall 275. The above-described example embodiment allows clutch oil to smoothly flow along the surface 273D2 of the base wall 273 located in the second direction D2 while allowing the annular portion 280 to have sufficient rigidity.

In the clutch apparatus 210 according to the present example embodiment, the ribs 244 incline radially inward as they extend in the second direction D2. The above-described example embodiment is able to prevent clutch oil from remaining between the ribs 244.

The example embodiments of the present invention have been described thus far. Each of the foregoing example embodiments, however, is only illustrative. The present invention may be embodied in various other forms.

In each of the foregoing example embodiments, the center-side cam portions 60 include the center-side assist cam surfaces 60A and the center-side slipper cam surfaces 60S. Alternatively, the center-side cam portions 60 may include either the center-side assist cam surfaces 60A or the center-side slipper cam surfaces 60S. The pressure-side cam portions 90 include the pressure-side assist cam surfaces 90A and the pressure-side slipper cam surfaces 90S. Alternatively, the pressure-side cam portions 90 may include either the pressure-side assist cam surfaces 90A or the pressure-side slipper cam surfaces 90S. The clutch centers 40 and 240 may each include no center-side cam portions 60. The pressure plates 70 and 270 may each include no pressure-side cam portions 90.

In the first example embodiment described above, the ribs 44 and the outer peripheral wall 45 are spaced away from each other in the radial direction. Alternatively, the ribs 44 and the outer peripheral wall 45 may be continuous (or connected) to each other. In other words, each rib 44 and the outer peripheral wall 45 may have no clearance therebetween in the radial direction, and the ribs 44 may incline radially inward as they extend in the first direction D1.

In the second example embodiment described above, the ribs 244 and the outer peripheral wall 275 are spaced away from each other in the radial direction. Alternatively, ribs 244 and the outer peripheral wall 275 may be continuous (or connected) to each other. In other words, each rib 244 and the outer peripheral wall 275 may have no clearance therebetween in the radial direction, and the ribs 244 may incline radially inward as they extend in the second direction D2.

In the second example embodiment described above, the clutch center 240 is configured not to hold the output-side rotary plates 22. The clutch center 240, however, is not limited to this configuration. The clutch center 240 may include center-side fitting teeth similar in configuration to the pressure-side fitting teeth 77 according to the first example embodiment, which are able to hold the output-side rotary plates 22.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A clutch apparatus to transmit a rotational driving force of an input shaft to an output shaft or cut off the rotational driving force, the clutch apparatus comprising:

a clutch center housed in a clutch housing holding input-side rotary plates to be rotationally driven in response to rotational driving of the input shaft, the clutch center being rotationally drivable together with the output shaft; and a pressure plate that is movable toward or away from the clutch center and rotatable relative to the clutch, the pressure plate holding output-side rotary plates alternatingly positioned with the input-side rotary plates center and being operable to push the input-side rotary plates and the output-side rotary plates; wherein the pressure plate includes:

an annular portion;

a base wall radially outward of the annular portion;

an annular outer peripheral wall radially outward of the base wall and extending in a movement direction, assuming that a direction in which the pressure plate is movable toward and away from the clutch center is the movement direction, a direction in which the pressure plate is movable toward the clutch center is a first direction, and a direction in which the pressure plate is movable away from the clutch center is a second direction;

a through hole extending through the base wall in the movement direction; and ribs extending in the second direction from a surface of the base wall located in the second direction, the ribs being connected to the annular portion; and the ribs and the outer peripheral wall are spaced away from each other in a radial direction.

2. The clutch apparatus according to claim 1, wherein the pressure plate includes pressure-side cam portions protruding in the first direction from a surface of the base wall located in the first direction, the pressure-side cam portions including pressure-side assist cam surfaces to, upon being rotated relative to the clutch center, produce a force in a direction in which the pressure plate is movable toward the clutch center so as to increase a pushing force for the input-side rotary plates and the output-side rotary plates.

3. The clutch apparatus according to claim 2, wherein the pressure-side cam portions include pressure-side slipper cam surfaces to move the pressure plate away from the clutch center so as to reduce the pushing force for the input-side rotary plates and the output-side rotary plates.

4. The clutch apparatus according to claim 3, wherein assuming that a direction from a first one of the pressure-side cam portions to a second one of the pressure-side cam portions in a circumferential direction is a first circumferential direction and a direction from the second one of the pressure-side cam portions to the first one of the pressure-side cam portions in the circumferential direction is a second circumferential direction, the pressure plate is rotatable in the first circumferential direction, the first circumferential direction being a direction from the pressure-side slipper cam surface of each of the pressure-side cam portions to the pressure-side assist cam surface thereof; and a defining surface of the base wall defining the through hole is flush or substantially flush with the ribs.

5. The clutch apparatus according to claim 1, wherein the pressure plate includes an oil discharge hole extending through the outer peripheral wall and through which clutch oil that has flowed out of the output shaft is to be discharged out of the pressure plate; and the oil discharge hole is radially outward of the through hole.

6. The clutch apparatus according to claim 1, wherein a length of each of the ribs in the radial direction is longer than a distance between each of the ribs and the outer peripheral wall.

7. The clutch apparatus according to claim 1, wherein the ribs incline radially inward as the ribs extend in the second direction.

8. A motorcycle comprising the clutch apparatus according to claim 1.

9. A clutch apparatus to transmit a rotational driving force of an input shaft to an output shaft or cut off the rotational driving force, the clutch apparatus comprising:

a clutch center housed in a clutch housing holding input-side rotary plates to be rotationally driven in response to rotational driving of the input shaft, the clutch center being rotationally drivable together with the output shaft; and a pressure plate that is movable toward or away from the clutch center and rotatable relative to the clutch center, the pressure plate holding output-side rotary plates alternatingly positioned with the input-side rotary plates and being operable to push the input-side rotary plates and the output-side rotary plates; wherein the pressure plate includes:

an annular portion;

a base wall radially outward of the annular portion;

pressure-side cam portions protruding in a first direction from a surface of the base wall located in the first direction, the pressure-side cam portions including pressure-side assist cam surfaces to, upon being rotated relative to the clutch center, produce a force in a direction in which the pressure plate is movable toward the clutch center so as to increase a pushing force for the input-side rotary plates and the output-side rotary plates, assuming that a direction in which the pressure plate is movable toward and away from the clutch center is a movement direction, a direction in which the pressure plate is movable toward the clutch center is the first direction, and a direction in which the pressure plate is movable away from the clutch center is a second direction;

an annular outer peripheral wall radially outward of the base wall and extending in the movement direction;

a through hole extending through the base wall in the movement direction so as to be located between adjacent ones of the pressure-side cam portions; and ribs extending in the second direction from a surface of the base wall located in the second direction, the ribs being connected to the annular portion; and the ribs and the outer peripheral wall are spaced away from each other in a radial direction.

10. The clutch apparatus according to claim 9, wherein the pressure-side cam portions include pressure-side slipper cam surfaces to move the pressure plate away from the clutch center so as to reduce the pushing force for the input-side rotary plates and the output-side rotary plates.

11. A clutch apparatus to transmit a rotational driving force of an input shaft to an output shaft or cut off the rotational driving force, the clutch apparatus comprising:

a clutch center housed in a clutch housing holding input-side rotary plates to be rotationally driven in response to rotational driving of the input shaft, the clutch center being rotationally drivable together with the output shaft; and a pressure plate that is movable toward or away from the clutch center and rotatable relative to the clutch center, the pressure plate holding output-side rotary plates alternatingly positioned with the input-side rotary plates and being operable to push the input-side rotary plates and the output-side rotary plates; wherein the pressure plate includes:

an annular portion;

a base wall radially outward of the annular portion;

pressure-side cam portions protruding in a first direction from a surface of the base wall located in the first direction, the pressure-side cam portions including pressure-side slipper cam surfaces to, upon being rotated relative to the clutch center, move the pressure plate away from the clutch center so as to reduce a pushing force for the input-side rotary plates and the output-side rotary plates, assuming that a direction in which the pressure plate is movable toward and away from the clutch center is a movement direction, a direction in which the pressure plate is movable toward the clutch center is the first direction, and a direction in which the pressure plate is movable away from the clutch center is a second direction;

an annular outer peripheral wall radially outward of the base wall and extending in the movement direction;

a through hole extending through the base wall in the movement direction so as to be located between adjacent ones of the pressure-side cam portions; and ribs extending in the second direction from a surface of the base wall located in the second direction, the ribs being connected to the annular portion; and the ribs and the outer peripheral wall are spaced away from each other in a radial direction.

* * * * *